(12) United States Patent
Sumida et al.

(10) Patent No.: US 10,054,790 B2
(45) Date of Patent: Aug. 21, 2018

(54) IMAGING OPTICAL SYSTEM

(71) Applicant: CANON KABUSHIKI KAISHA, Tokyo (JP)

(72) Inventors: Noa Sumida, Utsunomiya (JP); Yu Miyajima, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 15/467,295

(22) Filed: Mar. 23, 2017

(65) Prior Publication Data
US 2017/0276933 A1    Sep. 28, 2017

(30) Foreign Application Priority Data

Mar. 24, 2016 (JP) .................. 2016-059714

(51) Int. Cl.
*G02B 27/00* (2006.01)
*G02B 3/00* (2006.01)

(52) U.S. Cl.
CPC ....... *G02B 27/0018* (2013.01); *G02B 3/0056* (2013.01)

(58) Field of Classification Search
CPC . G02B 27/0018; G02B 3/0056; G02B 3/0062
USPC .......... 359/601, 739–741; 399/218
See application file for complete search history.

(56) References Cited

U.S. PATENT DOCUMENTS

| 7,898,738 B2* | 3/2011 | Yamamura ....... B29D 11/00278 250/208.1 |
| 7,933,070 B2* | 4/2011 | Yamamura ........... G03G 15/326 359/621 |
| 2014/0160573 A1* | 6/2014 | Teramura ............. G02B 3/0056 359/619 |
| 2015/0002596 A1 | 1/2015 | Morita et al. |
| 2015/0268386 A1 | 9/2015 | Miyajima et al. |
| 2015/0293468 A1 | 10/2015 | Morita et al. |

(Continued)

FOREIGN PATENT DOCUMENTS

| JP | 2012-247565 A | 12/2012 |
| JP | 2014-077964 A | 5/2014 |

(Continued)

*Primary Examiner* — Darryl J Collins
(74) *Attorney, Agent, or Firm* — Carter, DeLuca, Farrell & Schmidt, LLP

(57) ABSTRACT

Provided is imaging optical system, including: a first lens array including a plurality of lens rows each having a plurality of lenses arrayed in main array direction, the plurality of lens rows arranged in sub-array direction; and a second lens array including a plurality of lens rows each having a plurality of lenses arrayed in main array direction, the plurality of lens rows being arranged in sub-array direction. The imaging optical system forms an erect image of object in main array cross section, and forms an inverted image of object in sub-array cross section. At least one of first and second lens arrays includes at least one of a scattering and light-shielding portions arranged between adjacent lens rows. D/Rs≤0.2 is satisfied, where D represents length of at least one of scattering and light-shielding portions in sub-array direction, and Rs represents an effective diameter of imaging optical system in sub-array direction.

20 Claims, 11 Drawing Sheets

(56) References Cited

U.S. PATENT DOCUMENTS

2016/0202393 A1 7/2016 Saiga et al.
2017/0131669 A1 5/2017 Miyajima

FOREIGN PATENT DOCUMENTS

| JP | 2015-009431 A | 1/2015 |
| JP | 2015-118357 A | 6/2015 |

* cited by examiner

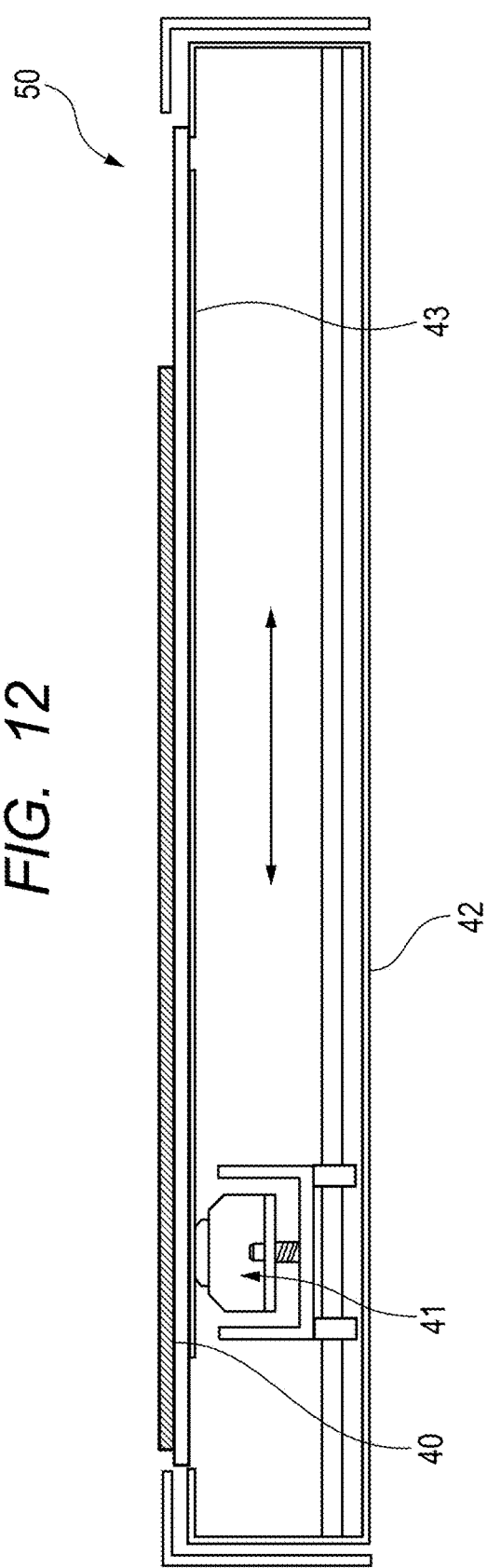

IMAGING OPTICAL SYSTEM

BACKGROUND OF THE INVENTION

Field of the Invention

The present invention relates to an imaging optical system, and more particularly, to an imaging optical system which is suitable for use in an image forming apparatus and an image reading apparatus.

Description of the Related Art

In recent years, there have been used an exposure device and a reading optical system which employ an imaging optical system including a lens array constructed by an array of a plurality of small-diameter lenses (lens array optical system).

The lens array optical system enables downsizing of components and reduction of the number of parts. Thus, the lens array optical system is advantageous for downsizing and cost reduction.

However, there is a fear in that the lens array optical system generates unnecessary ghost light fluxes in addition to desired light fluxes.

In Japanese Patent Application Laid-Open No. 2012-247565, there is disclosed a lens array optical system which includes a first lens array and a second lens array. In each of the first lens array and the second lens array, lens rows each formed of a plurality of lenses arrayed in a main array direction are arranged in a staggered manner in a sub array direction. The lens array optical system is configured to form an inverted image of an object in the sub array direction. Further, in the lens array optical system disclosed in Japanese Patent Application Laid-Open No. 2012-247565, there is arranged a light-shielding member having light-shielding openings arrayed in the main array direction so as to conform to the staggered arrangement to shield the unnecessary ghost light fluxes.

In Japanese Patent Application Laid-Open No. 2012-247565, consideration is made on a case where a light source having a plurality of light-emitting points is present on an optical axis of the lens array optical system. Thus, the light-shielding member of Japanese Patent Application Laid-Open No. 2012-247565 is intended for use in shielding only ghost light fluxes which are emitted from the light source, pass through a predetermined lens row in the first lens array, and thereafter enter a lens row of the second lens array arranged at the same position in the sub array direction as the predetermined lens row.

Meanwhile, when the light source is arranged with deviation from the optical axis of the lens array optical system in the sub array direction due to an assembling error or the like, ghost light fluxes as described below are generated. That is, ghost light fluxes which are emitted from the light source, pass through a predetermined lens row in the first lens array, and thereafter enter a lens row of the second lens array arranged at a different position in the sub array direction from the predetermined lens row are generated. Herein, such ghost light fluxes are referred to as sub array direction ghost light fluxes.

Further, as a matter of course, also in a case where a plurality of light source rows each having a plurality of light-emitting points arranged in the main array direction are arranged in the sub array direction, such sub array direction ghost light fluxes are generated.

In Japanese Patent Application Laid-Open No. 2012-247565, there is no disclosure as to shielding such sub array direction ghost light fluxes.

SUMMARY OF THE INVENTION

Therefore, the present invention has an object to provide an imaging optical system capable of shielding sub array direction ghost light fluxes.

According to one embodiment of the present invention, there is provide an imaging optical system, including: a first lens array including a plurality of lens rows each having a plurality of lenses arrayed in a first direction, the plurality of lens rows being arranged in a second direction which is perpendicular to the first direction and to an optical axis direction; and a second lens array including a plurality of lens rows each having a plurality of lenses arrayed in the first direction, the plurality of lens rows being arranged in the second direction, in which the imaging optical system is configured to form an erect image of an object in a first cross section which is perpendicular to the second direction, and is configured to form an inverted image of the object in a second cross section which is perpendicular to the first direction, in which at least one of the first lens array or the second lens array includes at least one of a scattering portion or a light-shielding portion arranged between adjacent lens rows, and in which the following expression is satisfied:

$$D/Rs \leq 0.2$$

where D represents a length of at least one of the scattering portion or the light-shielding portion in the second direction, and Rs represents an effective diameter of the imaging optical system in the second direction.

Further features of the present invention will become apparent from the following description of exemplary embodiments with reference to the attached drawings.

BRIEF DESCRIPTION OF THE DRAWINGS

FIG. 12 is a schematic cross-sectional view of an image reading apparatus to which the lens array optical system according to the first embodiment is mounted.

DESCRIPTION OF THE EMBODIMENTS

Now, an imaging optical system according to an embodiment of the present invention is described with reference to the drawings. In order to facilitate the understanding of the present invention, figures referred to below may be illustrated in scales different from actual ones.

First Embodiment

Figure 1A:
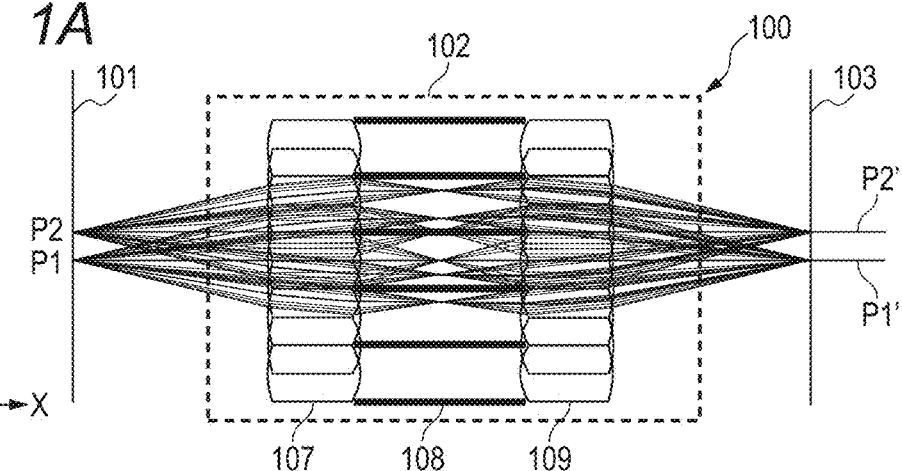
FIG. 1A is an X-Y cross-sectional projection view of an optical device according to a first embodiment of the present invention.
Figure 1B:
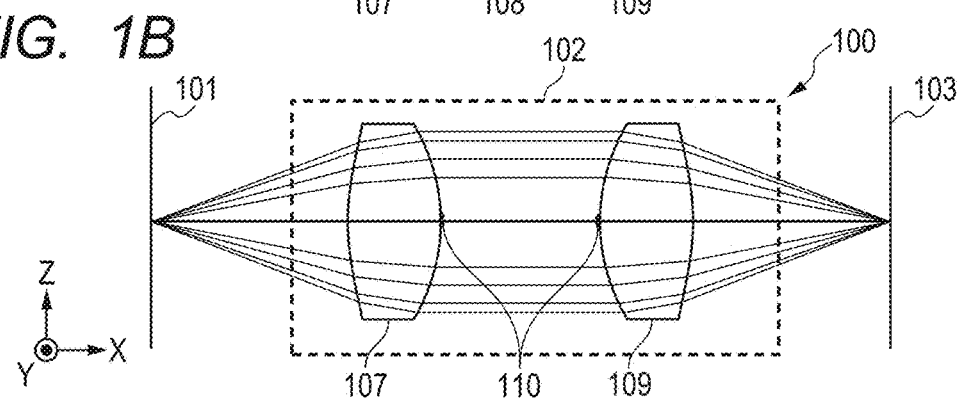
FIG. 1B is an X-Z cross-sectional view of the optical device according to the first embodiment.
Figure 1C:
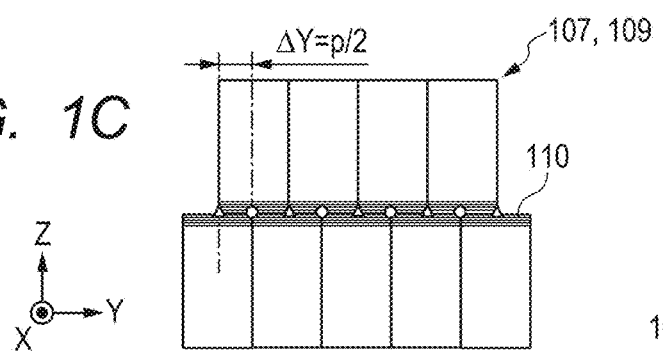
FIG. 1C is a Y-Z cross-sectional view of the optical device according to the first embodiment.

FIG. 1A, FIG. 1B, and FIG. 1C are an X-Y cross-sectional projection view, an X-Z cross-sectional view, and a Y-Z cross-sectional view, respectively, of an optical device 100 according to a first embodiment of the present invention.

Figure 1D:
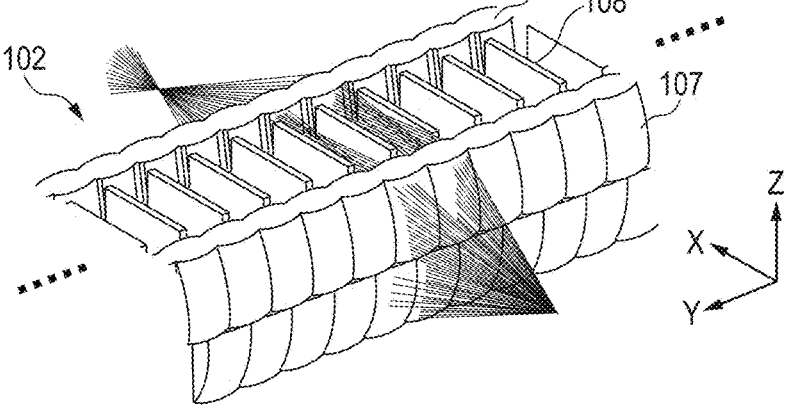
FIG. 1D is a perspective view of a lens array optical system according to the first embodiment.

FIG. 1D is a perspective view of an imaging optical system (lens array optical system) 102 of the optical device 100 according to the first embodiment.

The optical device 100 includes a light source 101, a lens array optical system 102, and a photosensitive unit 103. The lens array optical system 102 is constructed by a first lens array 107, light-shielding members 108, and a second lens array 109.

In the light source 101, a plurality of light-emitting points are arrayed at equal intervals along a Y direction (hereinafter referred to as "main array direction") in which a plurality of lenses constructing the first lens array 107 are mainly arrayed. In this embodiment, an LED is used for each light-emitting point of the light source 101.

In each of the first lens array 107 and the second lens array 109, a plurality of lenses are arrayed (lens row is formed) in the main array direction (first direction). Further, in each of the first lens array 107 and the second lens array 109, two rows of lenses are arranged in a staggered manner in a Z direction (hereinafter referred to as "sub array direction") which is orthogonal to an X direction (hereinafter referred to as "optical axis direction") and to the main array direction (Y direction).

The first lens array 107 and the second lens array 109 are arranged on an object side and an image side apart from each other in the optical axis direction so that respective boundary planes, which are formed between the lens rows, of the first lens array 107 and the second lens array 109 are flush with each other.

Herein, in each of the first lens array 107 and the second lens array 109, the lens row arranged on a positive side from the optical axis in the sub array direction (second direction) is defined as a top row, whereas the lens row arranged on a negative side is defined as a bottom row.

In each of the first lens array 107 and the second lens array 109, an array pitch P in the main array direction is 0.76 mm for both the top and bottom lens rows.

The staggered arrangement is an arrangement in which one of the top and bottom lens rows is shifted with respect to another in the main array direction only by one half of the array pitch p.

In FIG. 1C, white circles represent optical axes of the lenses in the top row, and white triangles represent optical axes of the lenses in the bottom row.

Herein, a minimum distance ΔY between the optical axis of the lens in the top row and the optical axis of the lens in the bottom row corresponds to a distance in the main array direction from an optical axis of a certain lens in the bottom row, as a reference, to an optical axis of a lens in the top row which is closest to the certain lens.

That is, the top lens row and the bottom lens row are shifted relative to each other in the main array direction by the distance ΔY to separate the respective optical axes in the main array direction by the distance ΔY, thereby achieving the staggered arrangement of the top and bottom lens rows.

In this embodiment, the minimum distance ΔY is set to be a half of the array pitch p in each of the first lens array 107 and the second lens array 109 in the main array direction. Thus, ΔY=p/2(=0.38 mm) is given.

As in this embodiment, when each of the first lens array 107 and the second lens array 109 has the staggered arrangement, an array cycle of the lenses as viewed in the main array direction is a half of the array pitch p. Thus, unevenness in imaging light amount becomes less noticeable.

The lens array optical system 102 is configured to form an erect equal-magnification image in the main array direction, and is configured to form an inverted image in the sub array direction.

As the photosensitive unit 103, a photosensitive drum is used, for example, in an image forming apparatus.

An interval between the light-emitting points of the light source 101 is several tens of micrometers, which is sufficiently smaller as compared to the array pitch p, which is at least several hundreds of micrometers, in the main array direction of each of the first lens array 107 and the second lens array 109. Thus, it can be considered that the light-emitting points are arranged in a substantially continuous manner.

Thus, the lens array optical system 102 forms an erect equal-magnification image in the main array direction, and hence, as illustrated in FIG. 1D, light fluxes emitted from one light-emitting point of the light source 101 are condensed at one point on the photosensitive unit 103 even after passing through the plurality of lenses arranged in the main array direction. For example, in FIG. 1A, light fluxes emitted from a light-emitting point P1 are condensed at a point P1', and light fluxes emitted from a light-emitting point P2 is condensed at a point P2'. Such property enables light exposure in accordance with light emission of the light source.

As illustrated in FIG. 1C, in each of the first lens array 107 and the second lens array 109, a scattering portion 110 is arranged between a lens surface of each lens constructing the top lens row and a lens surface of each lens constructing the bottom lens row (region of lens surfaces including the boundary of lens surfaces of the top and bottom rows). That is, in each of the first lens array 107 and the second lens array 109, the scattering portion 110 is arranged between lens surfaces of lenses constructing adjacent lens rows.

The scattering portion 110 is described later.

The first lens array 107 includes a plurality of first lenses (hereinafter sometimes referred to as "G1") 1071a, 1071b, and so forth arrayed in the top row and a plurality of first lenses (hereinafter sometimes referred to as "G1") 1072a, 1072b, and so forth arrayed in the bottom row. Similarly, the second lens array 109 includes a plurality of second lenses (hereinafter sometimes referred to as "G2") 1091a, 1091b, and so forth arrayed in the top row and a plurality of second lenses (hereinafter sometimes referred to as "G2") 1092a, 1092b, and so forth arrayed in the bottom row. The individual lenses constructing each of the first lens array 107 and the second lens array 109 form pairs, and optical axes of lenses forming each pair match with each other.

Figure 2A:
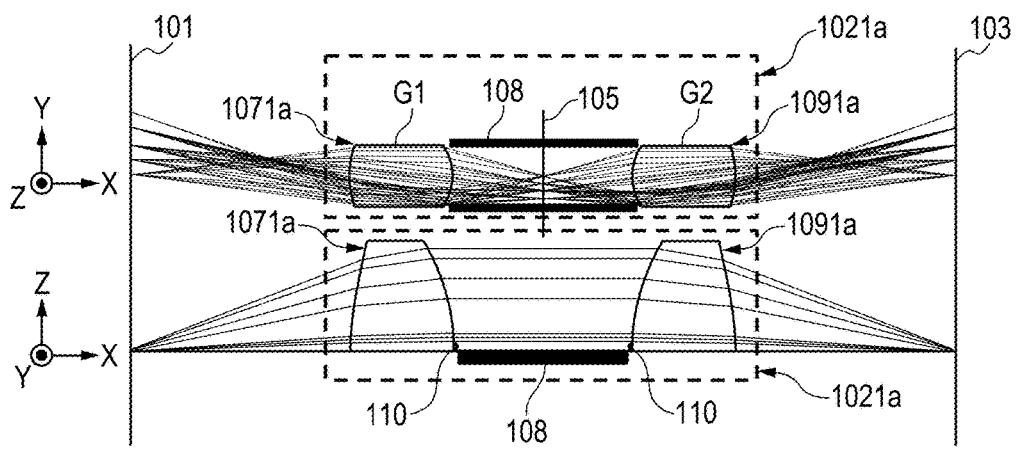
FIG. 2A is a main array cross-sectional view and a sub array cross-sectional view of a part of the lens array optical system according to the first embodiment.

FIG. 2A is a schematic cross-sectional view for illustrating a main array cross section (first cross section) and a sub array cross section (second cross section) of a part 1021a of the lens array optical system 102 in the optical device 100 according to this embodiment.

Figure 2B:
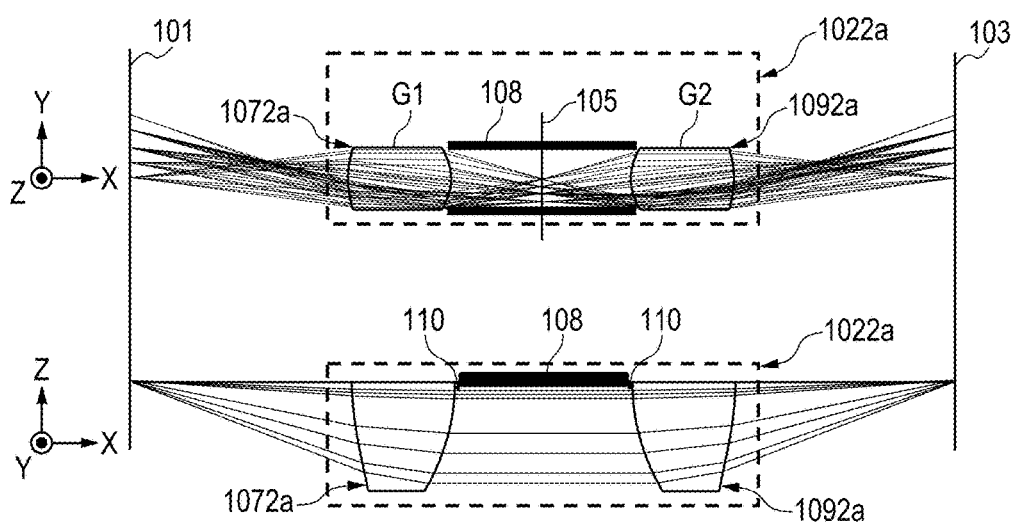
FIG. 2B is the main array cross-sectional view and the sub array cross-sectional view of the part of the lens array optical system according to the first embodiment.

FIG. 2B is a schematic cross-sectional view for illustrating a main array cross section and a sub array cross section of a part 1022a of the lens array optical system 102 in the optical device 100 according to this embodiment.

The part 1021a of the lens array optical system includes the first lens 1071a, a part of the light-shielding members 108, and the second lens 1091a, which are arranged so as to align with each other. Further, the part 1022a of the lens array optical system includes the first lens 1072a, a part of the light-shielding members 108, and the second lens 1092a, which are arranged so as to align with each other. A cross section, which is taken along a direction orthogonal to the optical axis, of each of the first lenses and the second lenses has a substantially rectangular shape.

In the main array direction, light fluxes emitted from one light-emitting point of the light source 101 pass through the G1, and then once form an image on an intermediate imaging plane 105, that is, form an intermediate image of an object on the intermediate imaging plane. After that, the light fluxes pass through the G2 and form an erect equal-magnification image on the photosensitive unit 103, that is, form an image of the intermediate image of the object on an image plane, or form an erect equal-magnification image (erect image) of the object.

The light-shielding members 108 serve to shield light fluxes having passed through the G1 and directed to another G2 having a different optical axis.

A range of from an object plane, which is the light source 101 herein, to the intermediate imaging plane 105 is referred to as a first optical system, and a range of from the intermediate imaging plane 105 to an image plane, which is the photosensitive unit 103 herein, is referred to as a second optical system.

The first lens array is configured to form an intermediate image of an object in the main array direction, and the second lens array is configured to form an image of the intermediate image of the object in the main array direction, or form an image of the intermediate image of the object on the image plane.

In the sub array direction, the light fluxes emitted from the light source 101 pass through the G1. After that, the light fluxes pass through the G2 without forming an image on the intermediate imaging plane 105, and form an inverted image on the photosensitive unit 103, or form an inverted image of an object.

As can be understood from FIG. 2A and FIG. 2B, through employment of the inverted imaging system in the sub array direction, a light capturing angle can be increased in the sub array direction while maintaining the imaging performance, thereby being capable of achieving compatibility between the imaging light amount and the imaging performance.

An imaging magnification of the first optical system in the main array direction is referred to as an intermediate imaging magnification β. The intermediate imaging magnification β in the first optical system of the optical device 100 according to this embodiment is set to −0.45.

Optical design values of the lens array optical system according to this embodiment are shown below in Table 1.

TABLE 1

| Light source wavelength | 780 | nm | Aspherical surface coefficient | G1R1 | G1R2 | G2R1 | G2R2 |
|---|---|---|---|---|---|---|---|
| Refractive index of G1 (light source wavelength) | 1.485954 | | C2,0 | 5.028E−01 | −8.255E−01 | 8.255E−01 | −5.028E−01 |
| Refractive index of G2 (light source wavelength) | 1.485954 | | C4,0 | −5.126E−01 | 2.916E−01 | −2.916E−01 | 5.126E−01 |
| Distance between object plane and G1R1 | 2.650 | mm | C6,0 | −2.472E−01 | −5.597E−01 | 5.597E−01 | 2.472E−01 |
| Distance between G1R1 and G1R2 | 1.251 | mm | C8,0 | 8.357E−02 | −1.894E−02 | 1.894E−02 | −8.357E−02 |
| Distance between G1R2 and G2R1 | 2.162 | mm | C10,0 | −6.918E+00 | −7.825E−01 | 7.825E−01 | 6.918E+00 |
| Distance between G2R1 and G2R2 | 1.251 | mm | C0,2 | 1.564E−01 | −1.950E−01 | 1.950E−01 | −1.564E−01 |
| Distance between G2R2 and image plane | 2.650 | mm | C2,2 | −1.587E−01 | 9.481E−02 | −9.481E−02 | 1.587E−01 |
| Effective diameter of lens optical system in main array direction | 0.700 | mm | C4,2 | −1.505E−01 | −3.002E−01 | 3.002E−01 | 1.505E−01 |
| Effective diameter of lens optical system in sub array direction | 2.440 | mm | C6,2 | 5.659E+00 | 3.066E+00 | −3.066E+300 | −5.659E+00 |
| Array pitch | 0.760 | mm | C8,2 | −1.384E+01 | −6.540E+00 | 6.540E+00 | 1.384E+01 |
| Intermediate imaging magnification in main array direction | −0.45 | | C0,4 | −3.679E−02 | −7.562E−03 | 7.562E−03 | 3.679E−02 |

TABLE 1-continued

| Light source wavelength | 780 | nm | Aspherical surface coefficient | G1R1 | G1R2 | G2R1 | G2R2 |
|---|---|---|---|---|---|---|---|
| | | | C2,4 | 1.480E−01 | 3.211E−02 | −3.211E−02 | −1.480E−01 |
| | | | C4,4 | −1.037E+00 | −5.900E−01 | 5.900E−01 | 1.037E+00 |
| | | | C6,4 | −1.894E+00 | −6.988E−01 | 6.988E−01 | 1.894E+00 |
| | | | C0,6 | 1.270E−02 | 1.106E−03 | −1.106E−03 | −1.270E−02 |
| | | | C2,6 | −7.715E−02 | −1.013E−03 | 1.013E−03 | 7.715E−02 |
| | | | C4,6 | 9.714E−01 | 4.133E−01 | −4.133E−01 | −9.714E−01 |
| | | | C0,8 | −6.106E−03 | −1.048E−03 | 1.048E−03 | 6.106E−03 |
| | | | C2,8 | −1.342E−02 | −1.827E−02 | 1.827E−02 | 1.342E−02 |
| | | | C0,10 | 1.281E−03 | 9.618E−05 | −9.618E−05 | −1.281E−03 |

Herein, an intersection between each lens surface and an optical axis is an origin, and the optical axis direction is an X-axis. Further, the main array direction is a Y-axis, and the sub array direction is a Z-axis. Still further, in Table 1, "E-x" corresponds to "×10$^{-x}$".

A G1R1 surface corresponds to a surface of the G1 on the light source 101 side (object side lens surface), and a G1R2 surface corresponds to a surface of the G1 on the photosensitive unit 103 side (image plane side lens surface). A G2R1 surface corresponds to a surface of the G2 on the light source 101 side (object side lens surface), and a G2R2 surface corresponds to a surface of the G2 on the photosensitive unit 103 side (image plane side lens surface).

Each of the G1R1 surface, the G1R2 surface, the G2R1 surface, and the G2R2 surface is formed of an anamorphic surface, and an aspherical shape thereof is expressed by the following aspherical Expression (1).

$$X = \sum_{i,j} C_{i,j} Y^i Z^j \quad (1)$$

Herein, X, Y, and Z represent coordinates in the optical axis direction, the main array direction, and the sub array direction, respectively, and $C_{i,j}$ (i,j=0, 1, 2 . . . ) are aspherical coefficients.

When a plurality of light sources each including a plurality of light-emitting points arrayed in the main array direction are arranged in the sub array direction, or when an arrangement error or the like has occurred in the light source, there is a case where the light source is arranged at a position deviated from the optical axis of the lens array optical system in the sub array direction.

Herein, consideration is made on a case where the light source is arranged with deviation in a +Z direction.

Figure 3A:
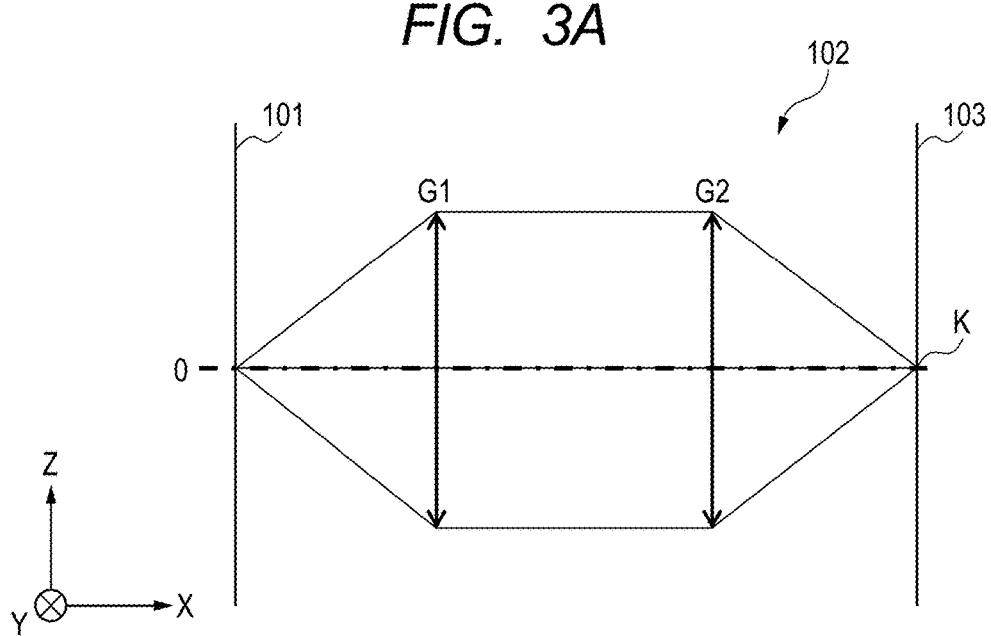
FIG. 3A is an explanatory view for illustrating optical paths along a sub array cross section in the optical device according to the first embodiment.
Figure 3B:
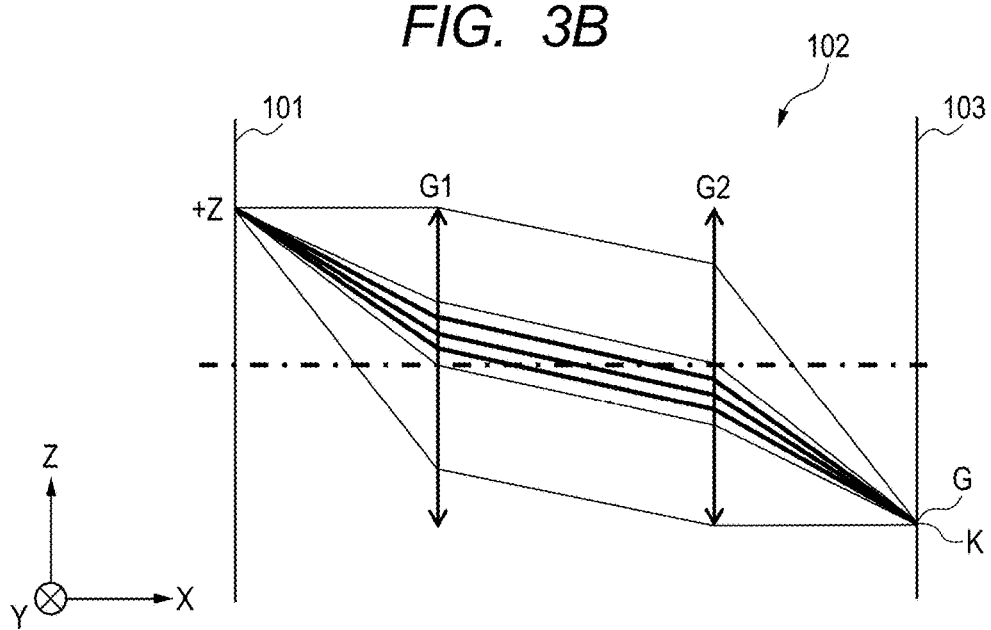
FIG. 3B is an explanatory view for illustrating optical paths along the sub array cross section in the optical device according to the first embodiment.

FIG. 3A is an explanatory view for illustrating optical paths in the sub array cross section in a case where the light source 101 is arranged on the optical axis of the lens array optical system 102. FIG. 3B is an explanatory view for illustrating optical paths in the sub array cross section in a case where the light source 101 is arranged with deviation from the optical axis of the lens array optical system 102 by +Z in the sub array direction.

Herein, the G1 and the G2 are indicated by the arrows as ideal lenses, and the optical axis of the lens array optical system 102 is indicated by the chain lines.

As illustrated in FIG. 3A, in the case where the light source 101 is arranged on the optical axis of the lens array optical system 102, all the light fluxes travel between the G1 and the G2 in parallel to the optical axis to form an imaging light flux K which forms a desired image on the photosensitive unit 103.

Meanwhile, as illustrated in FIG. 3B, in the case where the light source 101 is arranged with deviation from the optical axis of the lens array optical system 102 by +Z in the sub array direction, the light fluxes travel between the G1 and the G2 at a predetermined angle with respect to the optical axis in the sub array direction. Thus, among the light fluxes having passed through the G1 on the top row, light fluxes having passed near the optical axis travel across the optical axis during passage between the G1 and the G2 and enter the G2 on the bottom row. However, in this embodiment, the lens arrays are arranged in the staggered manner, and hence the optical axis of the G1 on the top row and the optical axis of the G2 on the bottom row do not match in the main array direction. Therefore, among the light fluxes having passed through the G1 on the top row, the light fluxes having passed near the optical axis are not formed into the imaging light fluxes K which forms a desired image on the photosensitive unit 103 but are formed into ghost light fluxes G.

In FIG. 3A and FIG. 3B, the imaging light fluxes K are indicated by the thin solid lines, and the ghost light fluxes G are indicated by the thick solid lines.

Such ghost light fluxes G are hereinafter referred to as sub array direction ghost light fluxes G.

As illustrated in FIG. 3B, the sub array direction ghost light fluxes G receive condensing power which is substantially equal to that for the desired imaging light fluxes K in the sub array direction. Thus, the sub array direction ghost light fluxes G are condensed at a position which is very close to the desired imaging light fluxes K on the photosensitive unit 103.

Figure 4A:
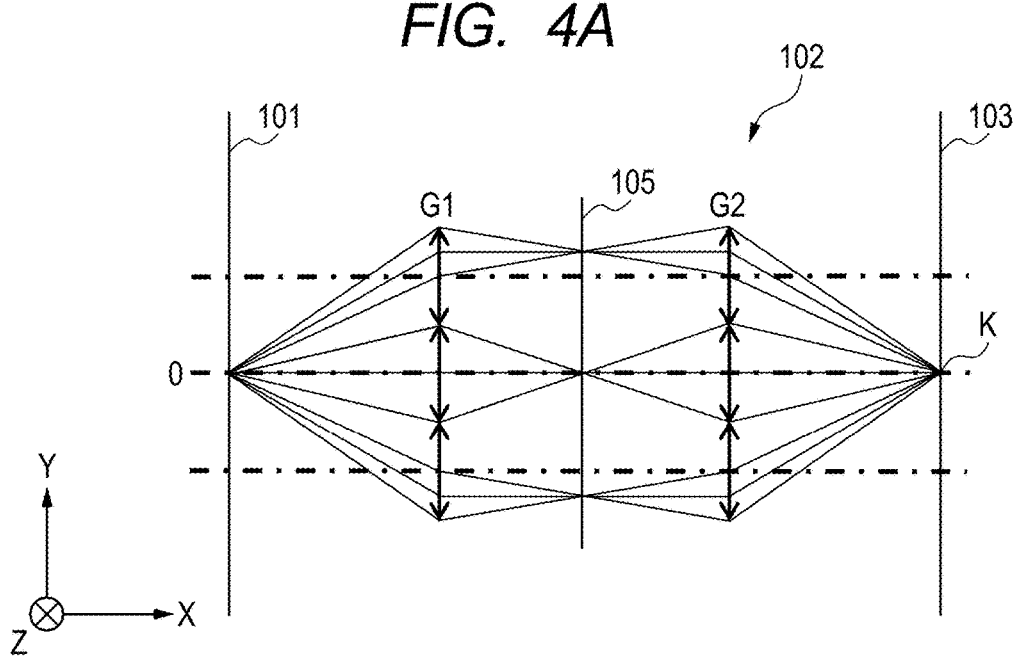
FIG. 4A is an explanatory view for illustrating optical paths along a main array cross section in the optical device according to the first embodiment.
Figure 4B:
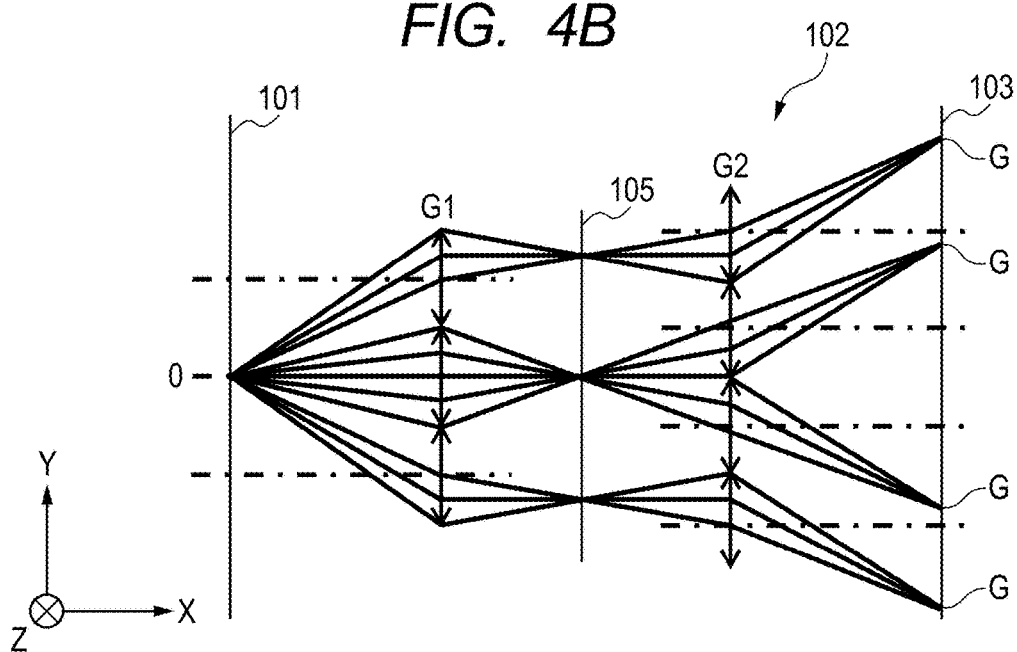
FIG. 4B is an explanatory view for illustrating optical paths along the main array cross section in the optical device according to the first embodiment.

FIG. 4A is an explanatory view for illustrating optical paths of the imaging light fluxes K in the main array cross section in the case where the light source 101 is arranged with deviation from the optical axis of the lens array optical system 102 in the sub array direction. FIG. 4B is an explanatory view for illustrating optical paths of the sub array direction ghost light fluxes G in the main array cross section in the case where the light source 101 is arranged with deviation from the optical axis of the lens array optical system 102 in the sub array direction.

As illustrated in FIG. 4A, the imaging light fluxes K pass through the G2 on the top row in the case of having passed through the G1 on the top row, whereas the imaging light fluxes K pass through the G2 on the bottom row in the case of having passed through the G1 on the bottom row. Thus, the optical axes of the G1 and the G2 substantially match with each other in the main array direction, and hence formation of a desired image on the photosensitive unit 103 is achieved also in the main array direction.

Meanwhile, as illustrated in FIG. 4B, with regard to the sub array direction ghost light fluxes G, light fluxes having passed near the optical axis among the light fluxes having passed through the G1 on the top row travel across the optical axis during passage between the G1 and the G2 and enter the G2 on the bottom row as described above. At this time, the optical axis of the G1 on the top row and the optical axis of the G2 on the bottom row do not match with each other in the main array direction. Thus, formation of a desired image on the photosensitive unit 103 is not achieved. As a result, those light fluxes, that is, the sub array direction ghost light fluxes G become unnecessary light. Accordingly, the sub array direction ghost light fluxes G cause degradation of image quality.

In the inverted imaging system including a plurality of lens rows in the sub array direction as in this embodiment, it is important to reduce the sub array direction ghost light fluxes G. In the apparatus disclosed in Japanese Patent Application Laid-Open No. 2012-247565, assumption is made on the lens array optical system having a point light source arranged on an optical axis. Thus, the problem related to the sub array direction ghost light fluxes does not arise.

Therefore, in the optical device 100 according to this embodiment, there is arranged the scattering portion 110 between a lens surface of each lens constructing the top lens row and a lens surface of each lens constructing the bottom lens row in each of the first lens array 107 and the second lens array 109 of the lens array optical system 102.

Figure 5:
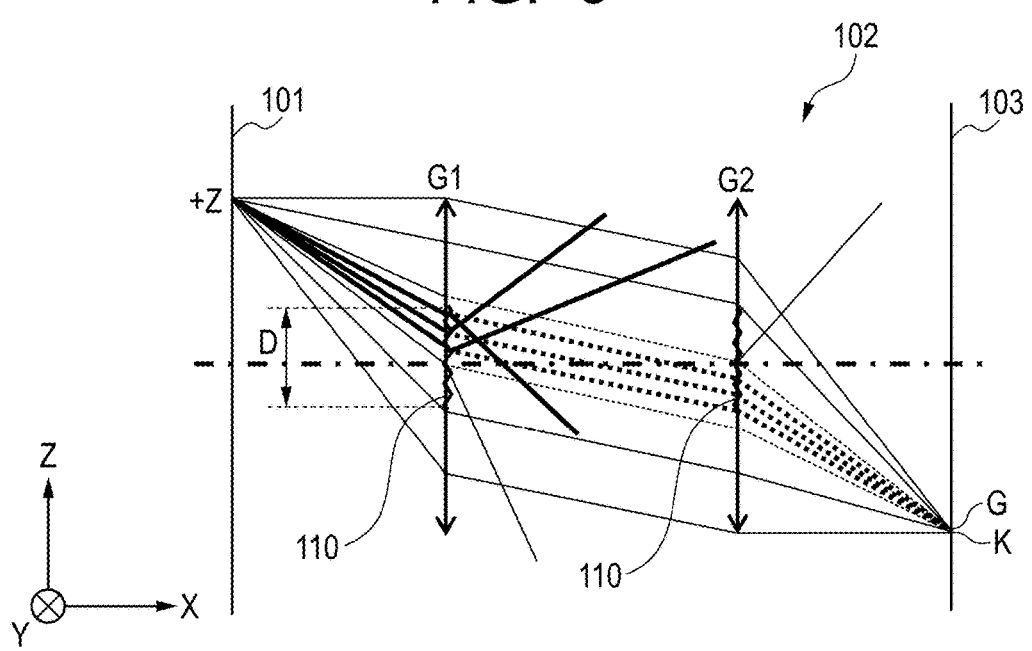
FIG. 5 is an explanatory view for illustrating optical paths along the sub array cross section in the optical device according to the first embodiment.

FIG. 5 is an explanatory view for illustrating optical paths in the sub array cross section in the case where the light source 101 is arranged with deviation from the optical axis of the lens array optical system 102 by +Z in the sub array direction.

As illustrated in FIG. 5, in the lens array optical system 102 of this embodiment, there is arranged at least one prism, which serves as the scattering portion and extends in the main array direction, between the photosensitive unit side lens surface of the G1 on the top row and the photosensitive unit side lens surface of the G1 on the bottom row and between the light source side lens surface of the G2 on the top row and the light source side lens surface of the G2 on the bottom row (the prisms are hereinafter sometimes referred to as "G1R2 prism" and "G2R1 prism").

With such a configuration, the sub array direction ghost light fluxes G are scattered by the prism 110, thereby being capable of preventing the sub array direction ghost light fluxes G from reaching near the desired imaging light fluxes K.

Further, through adjustment of the structure of the prism 110, the sub array direction ghost light fluxes G are directed to outside of an exposure region on the photosensitive unit 103 or are returned to the light source 101 side, thereby being capable of preventing the sub array direction ghost light fluxes G from reaching the photosensitive unit 103.

With this, degradation of imaging performance due to the sub array direction ghost light flux G can be reduced.

In the lens array optical system 102 of the optical device 100 according to this embodiment, the prism is used as the scattering portion 110.

The "scattering portion" in the meaning of this embodiment is not limited to a unit configured to scatter the sub array direction ghost light fluxes G to reduce influence on the imaging performance on the photosensitive unit 103. That is, the scattering portion encompasses a unit configured to direct the sub array direction ghost light fluxes G to the outside of the exposure region on the photosensitive unit 103, or a unit configured to return the sub array direction ghost fluxes G to the light source 101 side to prevent the sub array direction ghost fluxes G from reaching the photosensitive unit 103 and reduce the influence on the imaging performance on the photosensitive unit 103.

That is, the scattering portion of this embodiment also encompasses the configuration of returning the sub array direction ghost light fluxes G to the light source 101 side through total reflection with a prism shape.

In the lens array optical system 102 of the optical device 100 according to this embodiment, the prism 110 serving as the scattering portion is arranged. However, a light-shielding portion may be arranged in place of the scattering portion 110.

That is, in the lens array optical system 102 of the optical device 100 according to this embodiment, at least one of the first lens array 107 or the second lens array 109 includes at least one of the scattering portion or the light-shielding portion arranged between adjacent lens rows.

The "light-shielding portion" in the meaning of this embodiment includes, for example, a light absorbing portion. The term "light absorbing portion" used herein encompasses not only a member configured to completely absorb the sub array direction ghost light fluxes G but also a member causing at least light absorption as compared to a case where the light absorbing portion is not arranged. For example, such member may form a light-shielding film having transmissivity of 50%.

The prism shape of the scattering portion 110 of this embodiment is particularly effective in the case of forming an inverted image in the sub array direction as in the optical device 100 of this embodiment.

In the case of forming an inverted image in the sub array direction, light fluxes being the sub array direction ghost light fluxes G, which are substantially parallel light, enter the G1R2 prism. Thus, an outgoing angle of the sub array direction ghost light fluxes G from the G1R2 prism can easily be controlled by a top angle of the prism shape, thereby being capable of obtaining a high scattering effect.

In the lens array optical system 102 of the optical device 100 according to this embodiment, each of the first lens array 107 and the second lens array 109 includes two lens rows, which are each formed of a plurality of lenses arrayed in the main array direction and are arranged in the sub array direction in the staggered manner. The lens array optical system 102 of the optical device 100 according to this embodiment forms an inverted image of an object in the sub array direction.

As illustrated in FIG. 5, the G1R2 prism is arranged between the photosensitive unit side lens surface of each lens constructing the top lens row and the photosensitive unit side lens surface of each lens constructing the bottom lens row in the first lens array 107 of the lens array optical system 102 (end regions of the lens surfaces including the boundary between the lens surfaces on the top and bottom rows). Further, the G2R1 prism is arranged between the light source side lens surface of each lens constructing the top lens row and the light source side lens surface of each lens constructing the bottom lens row in the second lens array 109 of the lens array optical system 102.

Thus, the function of scattering the sub array direction ghost light fluxes G in the lens array optical system 102 of the optical device 100 according to this embodiment is performed by the G1R2 prism and the G2R1 prism in cooperation.

Next, a state of scattering of the sub array direction ghost light fluxes G by the G1R2 prism is described.

Figure 6A:
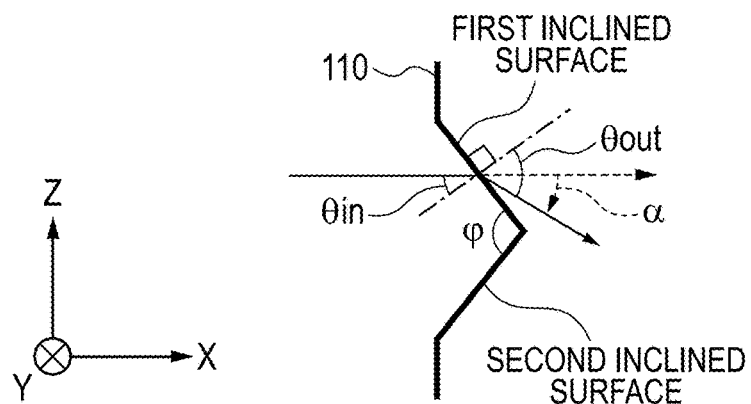
FIG. 6A is a view for illustrating a state of scattering of sub array direction ghost light fluxes in the lens array optical system according to the first embodiment.
Figure 6B:
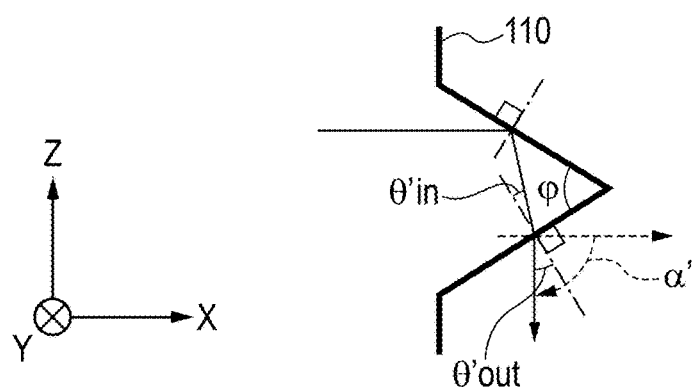
FIG. 6B is a view for illustrating the state of scattering of the sub array direction ghost light fluxes in the lens array optical system according to the first embodiment.
Figure 6C:
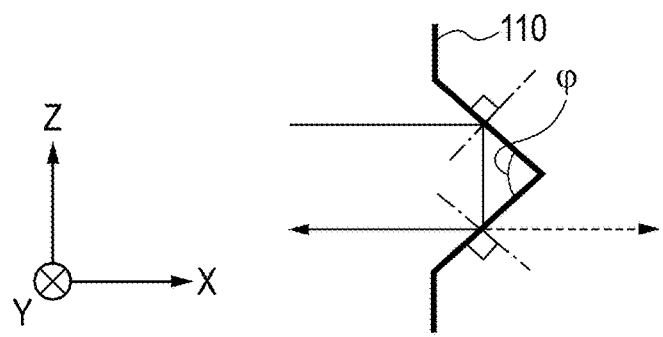
FIG. 6C is a view for illustrating the state of scattering of the sub array direction ghost light fluxes in the lens array optical system according to the first embodiment.

FIG. 6A, FIG. 6B, and FIG. 6C are illustrations of states of scattering of the sub array direction ghost light fluxes G by the G1R2 prism of the lens array optical system 102 according to this embodiment.

First, it is assumed that the lens array optical system 102 according to this embodiment is arranged in the air, and an inclined surface of the G1R2 prism, which receives entry of light fluxes when the sub array direction ghost light fluxes G pass through the first lens array 107 and enter the G1R2 prism, is referred to as a first inclined surface.

The sub array direction ghost light fluxes G enter the first inclined surface of the G1R2 prism at an incident angle $\theta in$, and the sub array direction ghost light fluxes G emitted from the first inclined surface at an outgoing angle $\theta out$.

The air has a refractive index $N_0$ of 1. The first lens array 107 has a refractive index N. The G1R2 prism has a top angle $\varphi$.

Herein, the lens array optical system 102 according to this embodiment forms an inverted image of an object in the sub array direction, and hence substantially parallel light enters the G1R2 prism. Herein, among the light fluxes emitted from the light source 101, light fluxes which enter the first lens array 107 at an angle with respect to the optical axis in the main array cross section have sufficiently smaller intensity as compared to light fluxes which enter the first lens array 107 along the optical axis, thus are disregarded.

Accordingly, the incident angle $\theta in$ is expressed by Expression (2) below.

$$\theta in = 90° - \varphi/2 \quad (2)$$

FIG. 6A is an illustration of a case where the incident angle $\theta in$ is smaller than a critical angle $\theta c$ ($= \arcsin(N_0/N)$). At this time, the outgoing angle $\theta out$ is expressed by Expression (3) below.

$$\theta out = \arcsin(N \sin(90° - \varphi/2)) \quad (3)$$

Herein, when an optical path changing angle $\alpha$ is given between an optical path of the sub array direction ghost light flux G entering the first inclined surface of the G1R2 prism and an optical path of the sub array direction ghost light flux G emitted from the first inclined surface, the optical path changing angle $\alpha$ is expressed by Expression (4) below.

$$\alpha = \theta out - \theta in \quad (4)$$

Next, in a case where the incident angle $\theta in$ is equal to or larger than the critical angle $\theta c$, as illustrated in FIG. 6B, the sub array direction ghost light flux G is totally reflected by the first inclined surface and enters a second inclined surface which is another inclined surface of the G1R2 prism.

Herein, the reflected light flux enters the second inclined surface of the G1R2 prism at an incident angle $\theta'in$, and the light flux is emitted from the second inclined surface at an outgoing angle $\theta'out$.

FIG. 6B is an illustration of a case where the incident angle $\theta'in$ is smaller than the critical angle $\theta c$. At this time, the outgoing angle $\theta'out$ is expressed by Expression (5) below.

$$\theta'out = \arcsin(N \sin(-90° + 3\varphi/2)) \quad (5)$$

Further, when an optical path changing angle $\alpha'$ is given between an optical path of the sub array direction ghost light flux G entering the first inclined surface and an optical path of the light flux emitted from the second inclined surface, the optical path changing angle $\alpha'$ is expressed by Expression (6) below.

$$\alpha' = \theta'out + \theta in \quad (6)$$

FIG. 6C is an illustration of a case where the incident angle $\theta'in$ is larger than the critical angle $\theta c$. At this time, the light flux is totally reflected by the second inclined surface.

That is, the sub array direction ghost light flux G is totally reflected twice in total by the first inclined surface and the second inclined surface of the G1R2 prism.

Herein, when an optical path changing angle $\alpha''$ is given between an optical path of the sub array direction ghost light flux G entering the first inclined surface and an optical path of the light flux reflected from the second inclined surface, the optical path changing angle $\alpha''$ is larger than 90°.

That is, the G1R2 prism has an effect of reflecting the sub array direction ghost light flux G, thereby maximizing an optical path changing effect.

However, in this case, the reflected light fluxes may be condensed at the light source to become a secondary light source. Thus, such a situation needs to be taken into account.

Specifically, in a case where the top angle $\varphi$ of the G1R2 prism satisfies Expression (7) below, the G1R2 prism totally reflects the sub array direction ghost light flux G twice in total.

$$2\theta c/3 + 60° < \varphi < 180° - 2\theta c \quad (7)$$

In view of the above, the optical path of the sub array direction ghost light flux G can be changed to a desired optical path through adjustment of the top angle $\varphi$ of the G1R2 prism.

Herein, in the optical device 100 according to this embodiment, when the first lens array 107 is made of plastic, that is, when the first lens array 107 has a refractive index of N=1.49, the critical angle $\theta c$ is 42.3°.

At this time, from Expression (7), the top angle $\varphi$ in the case of totally reflecting the sub array direction ghost light flux G by the G1R2 prism twice is 88.2° < $\varphi$ < 95.4°.

Herein, when consideration is made on cases where top angles $\varphi$ of the G1R2 prism are 110°, 90°, and 70°, the light fluxes travel along the optical paths illustrated in FIG. 6A, FIG. 6C, and FIG. 6B in the respective cases.

At this time, the optical path changing angles of the respective cases are 23.4°, 180.0°, and 67.6°.

Now, an effect of the lens array optical system 102 of the optical device 100 according to this embodiment is described.

First, consideration is made on a case where the light source is displaced by +0.1 mm in the sub array direction with respect to the optical axis of the lens array optical system 102 due to an arrangement error.

In this case, the sub array direction ghost light fluxes G take the optical paths illustrated in FIG. 3B.

Figure 7:
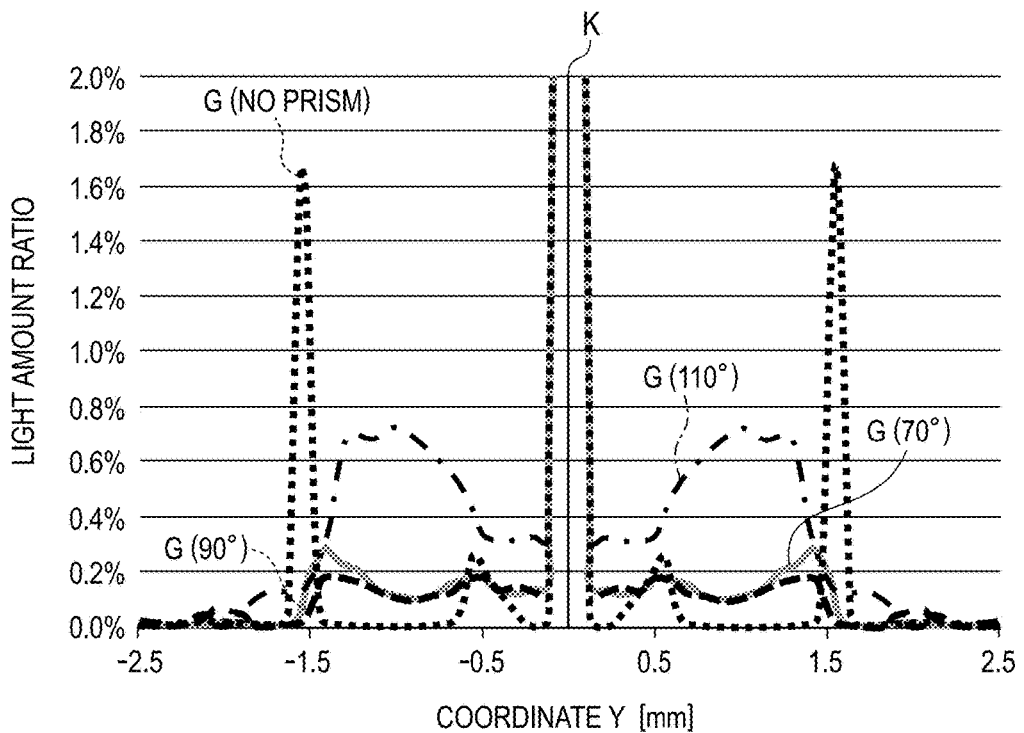
FIG. 7 is a graph for showing a light amount ratio of the sub array direction ghost light fluxes with respect to desired imaging light fluxes at a photosensitive unit.

FIG. 7 is a graph for showing a light amount ratio of the sub array direction ghost light flux G with respect to the desired imaging light flux K at the photosensitive unit 103, which is obtained through simulation based on the optical design values shown in Table 1.

Herein, a light amount of the desired imaging light flux K is 1 (100%). With regard to the sub array direction ghost light fluxes G, there are shown a case with no prism and cases with arrangement of the G1R2 prisms and G2R1 prisms having respective top angles $\varphi$ of 70°, 90°, and 110°.

Further, the light amounts of the imaging light flux K and the sub array direction ghost light flux G are shown with a line spread function (LSF) of multiplying the light amount at the photosensitive unit 103 within the range of ±15 mm in the sub array direction at each position in the main array direction.

Herein, with reference to FIG. 7, it can be understood that, in the cases with no prism and with the G1R2 prism and the G2R1 prism having the top angles $\varphi$ of 70°, 90°, and 110°, respectively, the light amount ratios of the sub array direction ghost light fluxes G are about 1.7%, about 0.3%, about 0.2%, and about 0.7%.

In the case where the top angle φ is 90°, when Expression (7) is satisfied, the G1R2 prism totally reflects the sub array direction ghost light flux G twice. Thus, the light amount ratio of the sub array direction ghost light flux G at the photosensitive unit 103 is most reduced.

Thus, in the case with no prism, the sub array direction ghost light flux G having the light amount ratio of about 1.7% with respect to the imaging light flux K is generated at the photosensitive unit 103, with the result that degradation of image quality occurs. In this embodiment, the G1R2 prism and the G2R1 prism having the top angles φ of 70°, 90°, and 110° are arranged, thereby being capable of suppressing the light amount ratio to be equal to or smaller than about 0.7% and reducing the degradation of image quality.

As described above, in the G1R2 prism and the G2R1 prism, the top angle φ may be any of 70°, 90°, and 110° to obtain an effect of sufficiently scattering the sub array direction ghost light fluxes G. In this embodiment, in view of a balance between the effect of suppressing the sub array direction ghost light flux and difficulty in manufacture, the prism shape having the top angle φ of 70° is employed.

As described above, in the lens array optical system according to this embodiment which has achieved compatibility between the favorable imaging light amount and the favorable imaging performance and achieved reduction of unevenness of those, even in a case where the light source is arranged with deviation from the optical axis in the sub array direction, the effect of reducing the influence of the ghost light can be obtained.

In this embodiment, the prism having the top angle φ of 70° is employed as described above. However, the value of the top angle φ is not limited to 70°. As long as the prism has the top angle φ satisfying the range of 30°≤φ≤150°, the effect of sufficiently scattering the sub array direction ghost light fluxes G can be obtained.

The top angle φ smaller than 30° is not preferred in view of mold machining and molding stability of the prism. Further, the top angle φ larger than 150° cannot achieve the effect of sufficiently scattering the sub array direction ghost light fluxes G.

Further, the prism does not need to have an acute shape at an edge thereof in the sub array cross section. For example, the shape may be flat, for example, like a trapezoidal shape. Moreover, the prism may have a polygonal shape or a substantially cylindrical shape.

When the light source is arranged on the optical axis of the lens array optical system 102 without an arrangement error, the arranged scattering portion 110 may cause the desired imaging light flux K to be shielded, with the result that reduction of the imaging light amount may occur.

Therefore, in view of the imaging light amount, it is preferred that the width D (see FIG. 5) of the scattering portion 110 in the sub array direction be small.

Figure 8:
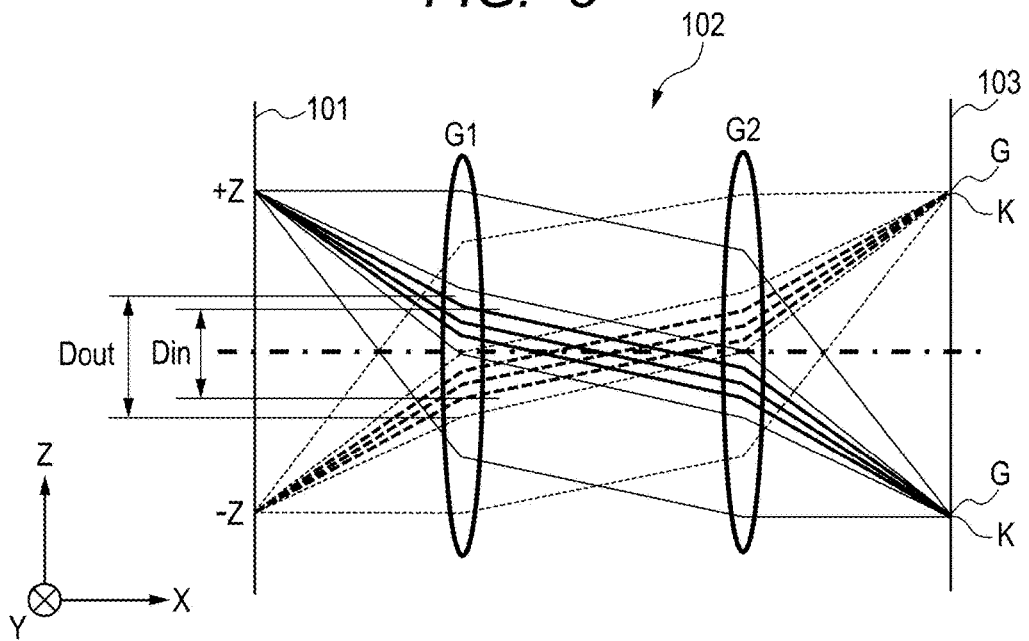
FIG. 8 is an explanatory view for illustrating optical paths along the sub array cross section in the optical device according to the first embodiment.

FIG. 8 is an explanatory diagram for illustrating optical paths in the sub array cross section in a case where the plurality of point light sources constructing the light source 101 are arranged with deviation from the optical axis of the lens array optical system 102 by +Z or −Z in the sub array direction.

In FIG. 8, the solid lines and the dotted lines represent optical paths of the light fluxes emitted from the point light sources arranged at the positions of +Z and −Z, respectively.

Further, the thin lines correspond to desired imaging light fluxes K, and the thick lines correspond to sub array direction ghost light fluxes G.

As can be understood from FIG. 8, on the light source side of the G1 and the photosensitive unit side of the G2, the optical paths of the sub array direction ghost light fluxes G emitted from the point light sources arranged at the position of +Z and the optical paths of the sub array direction ghost light fluxes G emitted from the point light sources arranged at the position of −Z have a large distance therebetween along the sub array direction when the optical paths are projected in the predetermined sub array cross section. Therefore, in this case, a required width Dout of the scattering portion 110 in the sub array direction needs to be set large.

Meanwhile, in the region between the G1 and the G2, the optical paths of the sub array direction ghost light fluxes G emitted from the point light sources arranged at the position of +Z and the optical paths of the sub array direction ghost light fluxes G emitted from the point light sources arranged at the position of −Z intersect when the optical paths are projected in the predetermined sub array cross section. Thus, the optical paths have a small distance therebetween along the sub array direction. Therefore, in this case, a width Din of the scattering portion 110 in the sub array direction can be set small.

That is, when the scattering portion 110 is arranged between the photosensitive unit side lens surface of the G1 on the top row and the photosensitive unit side lens surface of the G1 on the bottom row and between the light source side lens surface of the G2 on the top row and the light source side lens surface of the G2 on the bottom row, the width D of the scattering portion 110 in the sub array direction can be set small. With this, reduction of the imaging light amount of the imaging light fluxes K can be suppressed.

Figure 9A:
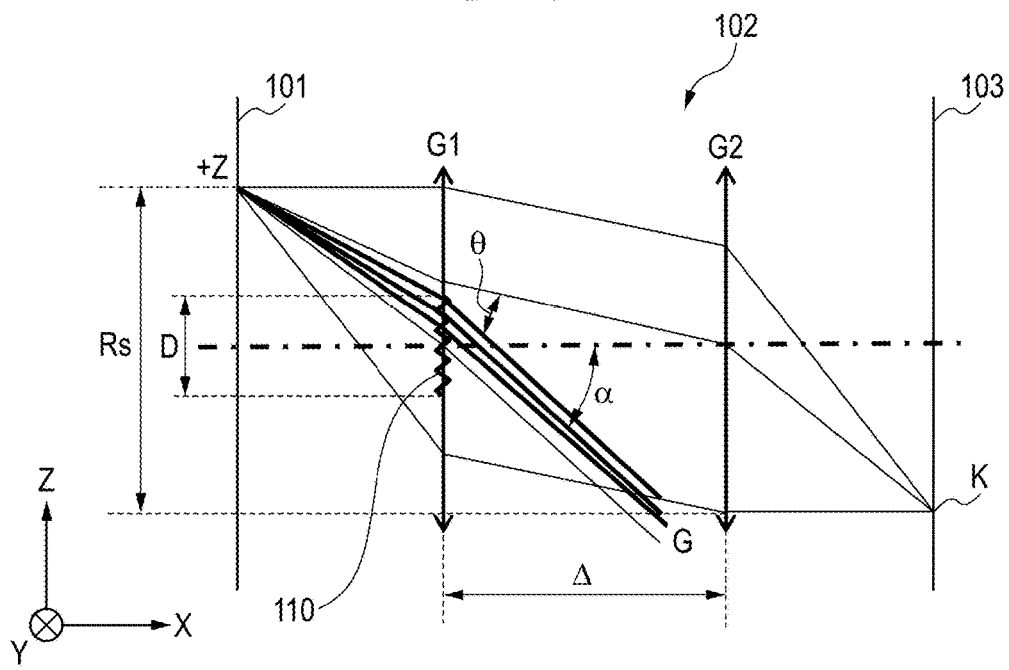
FIG. 9A is an explanatory view for illustrating optical paths along the sub array cross section in the optical device according to the first embodiment.
Figure 9B:
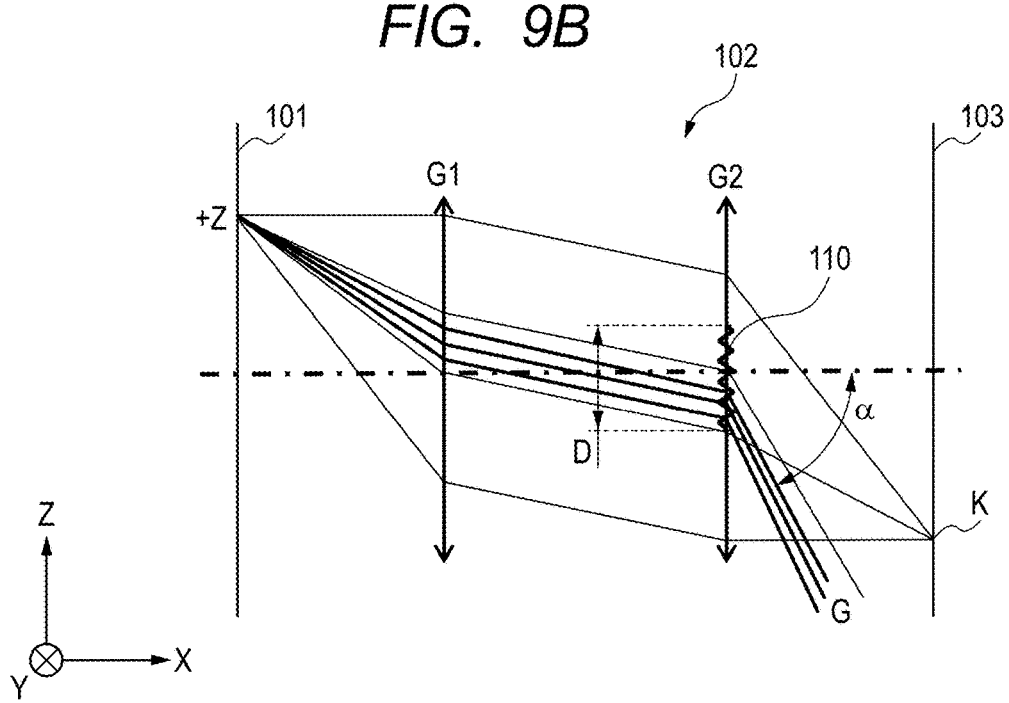
FIG. 9B is an explanatory view for illustrating optical paths along the sub array cross section in the optical device according to the first embodiment.

FIG. 9A and FIG. 9B are explanatory diagrams for illustrating optical paths in the sub array cross section in a case where the light source 101 is arranged with deviation from the optical axis of the lens array optical system 102 by +Z in the sub array direction.

It should be noted that, in the optical device 100 illustrated in FIG. 9A, the scattering portion (which is hereinafter sometimes referred to as "G1R2 scattering portion") 110 is arranged only between the photosensitive unit side lens surface of the G1 on the top row and the photosensitive unit side lens surface of the G1 on the bottom row. Further, it should be noted that, in the optical device 100 illustrated in FIG. 9B, the scattering portion (which is hereinafter sometimes referred to as "G2R1 scattering portion") 110 is arranged only between the light source side lens surface of the G2 on the top row and the light source side lens surface of the G2 on the bottom row.

As can be understood from FIG. 9A and FIG. 9B, the G1R2 scattering portion 110 has a larger distance from the photosensitive unit 103 in the optical axis direction than the G2R1 scattering portion 110. Thus, the optical path changing angle α by the G1R2 scattering portion 110 with respect to the sub array direction ghost light fluxes G may be small.

Thus, when a member having an embossed scattering surface configured to scatter the sub array direction ghost light fluxes G is used as the G1R2 scattering portion 110, a scattering surface having a small degree of scattering can be used. Further, when a prism configured to prevent the sub array direction ghost light fluxes G from being directed to the exposure region on the photosensitive unit 103 is used as the G1R2 scattering portion 110, an angle of bending the optical paths may be set small.

In particular, in a case where the prism is used as the scattering portion 110, when an attempt is made to bend the optical paths of the sub array direction ghost light fluxes G only by the G2R1 scattering portion 110 without arrangement of the G1R2 scattering portion 110, the shape of the prism is strictly limited. However, in the case where the prism is used as the scattering portion 110, when the G1R2 scattering portion 110 is arranged, the degree of freedom in top angle φ is increased, and the present invention is advantageous also in view of ease of molding.

From the description above, when at least the G1R2 scattering portion 110 among the G1R2 scattering portion 110 and the G2R1 scattering portion 110 is arranged to scatter the sub array direction ghost light fluxes G, the width D of the scattering portion 110 in the sub array direction can be set small. With this, reduction of the imaging light amount of the desired imaging light fluxes K can be suppressed, which is preferred.

In the optical device 100 according to this embodiment, both the G1R2 scattering portion 110 and the G2R1 scattering portion 110 are arranged. With this, the function of scattering the sub array direction ghost light fluxes G can be performed in cooperation as compared to the case where only one of the G1R2 scattering portion 110 and the G2R1 scattering portion 110 is arranged. Therefore, the width D of the scattering portion 110 in the sub array direction can be further reduced, thereby being capable of suppressing reduction of the imaging light amount of the desired imaging light fluxes K.

Next, the optical design values in the optical device 100 according to this embodiment are specifically discussed. Herein, for simplification, discussion is made on the case where only the G1R2 scattering portion 110 is arranged. However, the discussion is also applicable to the case where both the G1R2 scattering portion 110 and the G2R1 scattering portion 110 are arranged.

As illustrated in FIG. 9A, when an effective diameter of the lens array optical system 102 in the sub array direction is represented by Rs, the amount of reduction of the imaging light amount of the light-emitting point on the optical axis by the G1R2 scattering portion 110 can approximately be expressed by D/Rs.

In the optical device 100 according to this embodiment, the scattering portion 110 is arranged to shield the sub array direction ghost light fluxes G. With this, the imaging light amount of the light-emitting point on the optical axis is also reduced, with the result that image degradation may occur.

Thus, it is important to optimally design the lens array optical system 102 of the optical device 100 according to this embodiment in consideration of the balance between shielding of the sub array direction ghost light fluxes G and reduction of the imaging light amount.

Specifically, it is preferred that following Expression (8) be satisfied.

$$D/Rs \leq 0.2 \qquad (8)$$

When Expression (8) is not satisfied, there is large reduction of the imaging light amount, which implies that the lens array optical system is not designed with good balance. Thus, the effect of the present invention cannot be obtained.

In this embodiment, D=0.4 mm and Rs=2.44 mm are given. When those values are substituted in Expression (8), D/Rs=0.4 mm/2.44 mm=0.164<0.20 is obtained.

Thus, it can be said that the lens array optical system 102 of the optical device 100 according to this embodiment is designed in consideration of the balance between shielding of the sub array direction ghost light fluxes G and reduction of the imaging light amount.

As is considered in view of the imaging light amount of the desired imaging light flux K, it is preferred that the width D of the scattering portion 110 in the sub array direction be small.

Further, in consideration of a case where a plurality of linearly arranged light sources are used for brightness and in consideration of ease of assembling, it is preferred that a shift (deviation) allowable amount of the light source 101 from the optical axis in the sub array direction be large.

However, when the light source 101 is arranged with a shift from the optical axis in the sub array direction, the light fluxes emitted from the light source 101 enter the G1 and the G2 at an angle.

Herein, as illustrated in FIG. 9A, when an angle of the optical path of the light flux with respect to the optical axis in the sub array direction between the G1 and the G2 is represented by θ, the allowable range of the angle θ is θ≤15° in view of that aberration is less likely to be reduced, and the imaging performance is degraded.

Thus, when a surface distance between the G1 and G2 is represented by Δ, a minimum thickness $D_{edge}$ of the scattering portion 110 in the sub array direction, which is necessary in a case of shielding the sub array direction ghost light fluxes G by the scattering portion 110, is $D_{edge}$=Δ tan 15°=0.27Δ.

Thus, it can be understood that, in this embodiment, the width D of the scattering portion 110 in the sub array direction is sufficient with the minimum thickness $D_{edge}$ at maximum.

Thus, when following Expression (9) is satisfied, unnecessary increase in width D of the scattering portion 110 in the sub array direction and unnecessary increase in reduction of the imaging light amount can be prevented.

$$D \leq D_{edge} = 0.27\Delta \qquad (9)$$

In this embodiment, D=0.4 mm and Δ=2.162 mm are given. When those values are substituted in Expression (9), D=0.4 mm<0.27×2.162 mm=0.584 mm is obtained. Thus, the lens array optical system 102 of the optical device 100 according to this embodiment satisfies Expression (9). With this, the effect of preventing unnecessary increase in reduction of the imaging light amount by the scattering portion 110 can be obtained.

As the scattering portion 110 arranged in the lens array optical system 102 of the optical device 100 according to this embodiment, there is employed a prism which is capable of bending the optical paths in the sub array cross section and extends in the main array direction. That is, in the prism, a ridge line is parallel to the main array direction, or the ridge line has a shape conforming to the lens surface in the main array cross section. In this specification, the prism is not strictly limited to have a triangular columnar (polygonal columnar) shape, and is described as having a shape including a shape in which a ridge line conforms to the lens surface.

However, the scattering portion 110 according to this embodiment is not limited to those. There may also be employed a prism which is capable of bending the optical path in the main array cross section and has a ridge line which is parallel to the sub array direction. In this case, when a shielding surface configured to shield the ghost light fluxes directed to a lens having a different optical axis in the main array direction is arranged, the effect of highly suppressing the sub array direction ghost light fluxes can be obtained.

Further, as the scattering portion 110, there may be employed a prism in which the ridge line is parallel to any direction in a cross section perpendicular to the optical axis.

Still further, as the scattering portion 110, there may be employed a prism having a plurality of protrusions. However, it should be noted that the prism having the plurality of protrusions is not easily processed during manufacture.

As described above, the effect of scattering the sub array direction ghost light fluxes G by the prism 110, specifically, the optical path changing angle α is mainly determined by the top angle φ of the prism 110.

Therefore, when, as the scattering portion 110, a plurality of rows of prisms, which extend in the main array direction such that the ridge line is parallel to the main array direction, are arranged, the scattering effect substantially does not change as long as the top angles φ are equal to each other.

Figure 10A:
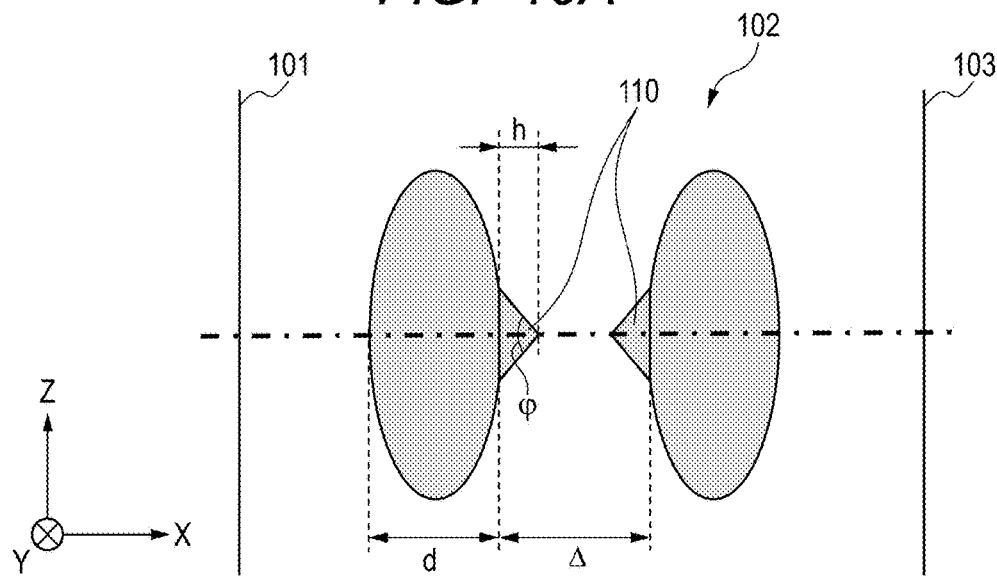
FIG. 10A is a sub array cross-sectional view of the lens array optical system according to the first embodiment.
Figure 10B:
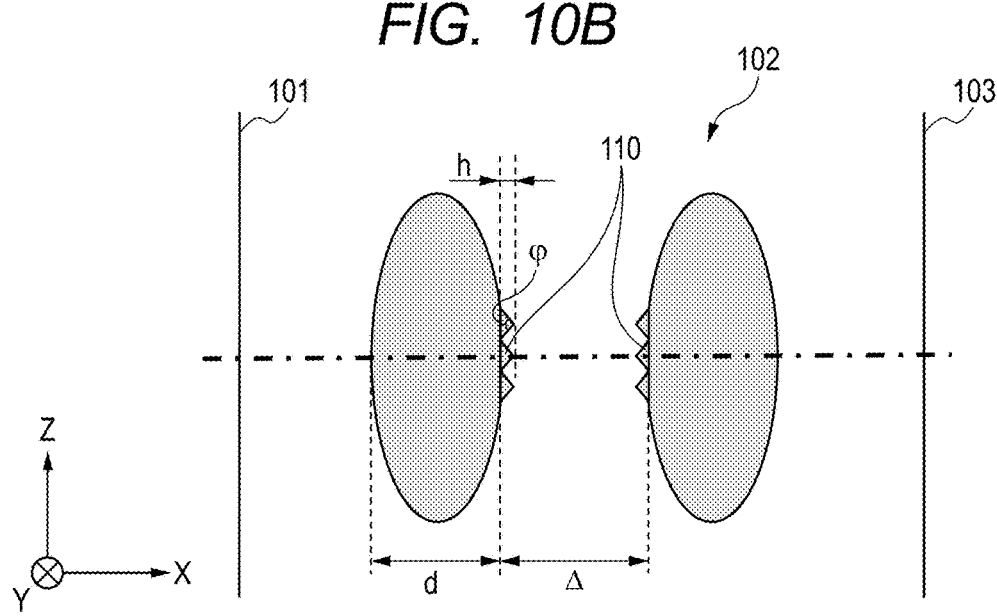
FIG. 10B is a sub array cross-sectional view of the lens array optical system according to the first embodiment.

FIG. 10A and FIG. 10B are sub array cross-sectional views of the lens array optical system 102 according to this embodiment. In FIG. 10A, one row of prism extending in the main direction is arranged as the scattering portion 11C. In FIG. 10B, three rows of prisms extending in the main array direction are arranged.

As illustrated in FIG. 10A and FIG. 10B, it can be understood that, when a plurality of rows of prisms are arranged, a height h of each prism in the optical axis direction can be set small.

Based on this fact, in the lens array system 102 according to this embodiment, as the scattering portion 110, there are arranged ten rows of prisms extending in the main array direction such that the ridge lines are parallel to the main array direction.

With this, the first lens array 107 and the second lens array 109 can easily molded and assembled.

In the lens array optical system, when a height h of the prism being the scattering portion in the optical axis direction is set larger as compared to a thickness d of each lens constructing the lens array, a center of gravity of the lens array comes closer to the prism side, with the result that there is difficulty in retaining the lens array itself.

Thus, it is preferred that the height h of the prism in the optical axis direction be equal to or smaller than 10% of the thickness d of each lens constructing the lens array, that is, following Expression (10) be satisfied.

$$h/d \leq 0.1 \quad (10)$$

In this embodiment, d=1.251 mm and h=0.014 mm are given. When those values are substituted in Expression (10), h/d=0.014 mm/1.251 mm=0.011≤0.1 is obtained.

Thus, in the lens array optical system 102 according to this embodiment, the first lens array 107 and the second lens array 109 can easily be retained.

Further, in the lens array optical system, when the height h of the prism being the scattering portion in the optical axis direction is larger as compared to the distance Δ between the first lens array and the second lens array in the optical axis direction, the following problems may arise. For example, there is difficulty in arranging a member for adjustment of a relative position between the first lens array and the second lens array. Further, for example, when the relative position between the first lens array and the second lens array is to be adjusted, the prism may come into contact with the lens array, with the result that there is a fear of damaging the lens array. Therefore, it becomes disadvantageous for assembly of the lens array optical system.

Therefore, it is preferred that the height h of the prism in the optical axis direction be equal to or smaller than 10% of the distance Δ between the first lens array and the second lens array in the optical axis direction, that is, following Expression (11) be satisfied.

$$h/\Delta \leq 0.1 \quad (11)$$

In this embodiment, Δ=2.162 mm and h=0.014 mm are given. When those values are substituted in Expression (11), h/Δ=0.014 mm/2.162 mm=0.006≤0.1 is obtained.

Thus, in the lens array optical system 102 according to this embodiment, the above-mentioned problems become less liable to arise, thereby being capable of ensuring ease of assembly.

The prism 110 being the scattering portion arranged in the lens array optical system 102 of the optical device 100 according to this embodiment may be formed so as to conform to the aspherical shape of the lens surface, or so as to be along the lens surface of each lens constructing the first lens array 107 and the second lens array 109.

Thus, the scattering portion 110 is not a triangular columnar prism, and the height h of the prism-shaped scattering portion 110 in the optical axis direction changes in accordance with a position in the main array direction. Further, the ridge line which is parallel to the main array direction of the prism-shaped scattering portion 110 extending in the main array direction may also be a curved line. The intensity distribution of the light flux emitted from each light-emitting point (LED) of the light source is the largest in the optical axis direction. Therefore, when the prism is formed so that the angle formed between both surfaces sandwiching the ridge line constructing the prism in the sub array cross section satisfies the above-mentioned condition, the effect of this embodiment can sufficiently be obtained even with the prism shape which conforms to the shape of the lens surface.

As described above, when the prism-shaped scattering portion 110 is formed into a shape conforming to the lens surface, there is no need to form the prism to be irrelevantly acute, which is advantageous also in view of rigidity.

Further, the lens surface of each lens constructing the first lens array 107 and the second lens array 109 can collectively be molded with the prism-shaped scattering portion 110. Thus, there is no need to assemble a prism which is formed separately from the lens array, thereby being capable of easily performing molding.

In this embodiment, the prism is arranged as the scattering portion 110. However, the scattering portion 110 is not limited to the prism. That is, the embossed scattering surface may be formed between the lens surface of each lens constructing the top lens row and the lens surface of each lens constructing the bottom lens row in the first lens array 107 and the second lens array 109 of the lens array optical system 102.

Herein, the embossed scattering surface is not limited to have a geometrical pattern such as a satin pattern, a grey pattern, or a grain pattern, and also includes a surface having a random concavo-convex structure.

The scattering effect of the embossed scattering surface is dependent on an average depth of embossed parts. In general, higher scattering effect can be obtained as the average depth of the embossed parts becomes larger.

In this embodiment, it is preferred that the average depth of the embossed parts be equal to or larger than 8 μm and equal to or smaller than 30 μm.

When the average depth of the embossed parts is smaller than 8 μm, the scattering effect becomes lower. Meanwhile, when the average depth of the embossed parts is larger than 30 μm, there is difficulty in mold release at the time of molding.

It is preferred that an aperture (opening) of the lens surface of each lens constructing the lens array optical system 102 of the optical device 100 according to this embodiment have a substantially rectangular shape. That is, when an opening surface for the light flux in a height of an object on the axis of the first optical system and the second optical system is formed into the substantially rectangular shape, the lens surfaces can be arranged without a gap to a maximum extent, thereby being capable of improving the light use efficiency. Here, the substantially rectangular shape includes a shape having a curved line on at least one side of sides constructing a rectangle, and a shape having no apex and being formed into a substantially circular shape or a substantially oval shape.

In this embodiment, in each of the first lens array 107 and the second lens array 109 of the lens array optical system 102, two lens rows are arranged in the sub array direction. However, not limited thereto, three or more lens rows may be arranged. That is, in this embodiment, there may arranged two or more lens rows.

In this case, in at least one of the first lens array 107 or the second lens array 109, it is only necessary that at least one of the scattering portion or the light-shielding portion arranged between at least one pair of lens rows of the adjacent lens rows be provided.

In this embodiment, in each of the first lens array 107 and the second lens array 109 of the lens array optical system 102, the shape of each lens constructing the top lens row and the shape of each lens constructing the bottom lens row are the same. However, not limited thereto, in at least one of the first lens array 107 or the second lens array 109, the shape of each lens constructing the top lens row and the shape of each lens constructing the bottom lens row may be different from each other.

In this embodiment, the optical axis of each lens constructing the lens array optical system 102 is located on a connection portion between the top lens row and the bottom lens row in the sub array direction in each of the first lens array 107 and the second lens array 109. However, not limited thereto, the optical axis of each lens constructing the lens array optical system 102 may be located at a position other than the connection portion between the top lens row and the bottom lens row in the sub array direction in the first lens array 107 and the second lens array 109.

In the first optical system of the optical device 100 according to this embodiment, the intermediate imaging magnification β is set to −0.45. However, as long as the intermediate imaging magnification β falls within the range which enables formation of an erect equal-magnification image, the intermediate imaging magnification β is not limited to −0.45.

In this embodiment, each lens constructing the top lens row and each lens constructing the bottom lens row in each of the first lens array 107 and the second lens array 109 of the lens array optical system 102 are obtained by cutting the same lens along the main array cross section which is parallel to the optical axis direction and the main array direction. However, not limited thereto, each lens constructing the top lens row and the bottom lens row in each of the first lens array 107 and the second lens array 109 of the lens array optical system 102 may be obtained by cutting along a cross section other than the main array cross section as long as the plane is parallel to the optical axis.

In this embodiment, the shape of the lens surface of each lens constructing each of the first lens array 107 and the second lens array 109 of the lens array optical system 102 is symmetrical over the optical axis. However, not limited thereto, the lens surface may have an asymmetrical shape.

In this embodiment, with regard to at least one of the first lens array 107 or the second lens array 109, when the amount of separation in the main array direction between optical axes of two lenses adjacent to each other in the sub array direction is 0, the lens surfaces of the two lenses can be expressed by Expression (1).

In this embodiment, the shape of the lens surface of each lens constructing the first lens array 107 and the shape of the lens surface of each lens constructing the second lens array 109 in the lens array optical system 102 are symmetrical with each other. However, not limited thereto, it is not necessary that the shape of the lens surface of each lens constructing the first lens array 107 and the shape of the lens surface of each lens constructing the second lens array 109 be symmetrical with each other.

In this embodiment, in each of the first lens array 107 and the second lens array 109 of the lens array optical system 102, the array pitch p of the top lens row in the main array direction is equal to the array pitch p of the bottom lens row in the main array direction. However, not limited thereto, in at least one of the first lens array 107 or the second lens array 109, the array pitch p of the top lens row in the main array direction may be different from the array pitch p of the bottom lens row in the main array direction.

In this embodiment, with regard to a sub array direction effective range of each lens in the top lens row and a sub array direction effective range of each lens in the bottom lens row in the lens arrays 107 and 109, only one of those ranges falls on an axis parallel to the main array direction at any position in the sub array direction. However, not limited thereto, both the ranges may fall on the axis parallel to the main array direction at a certain position in the sub array direction.

The lens array optical system 102 of the optical device 100 according to this embodiment is designed so that an erect equal-magnification image is formed in the sub array cross section. However, not limited thereto, the lens array optical system 102 may be designed so that a non-erect equal-magnification image is formed.

With the lens array optical system 102 of the optical device 100 according to this embodiment, the imaging light amount unevenness and the imaging performance unevenness are reduced, and the influence of the ghost light can be alleviated even in a case where the light source is arranged with deviation from the optical axis in the sub array direction.

[Image Forming Apparatus]

Figure 11:
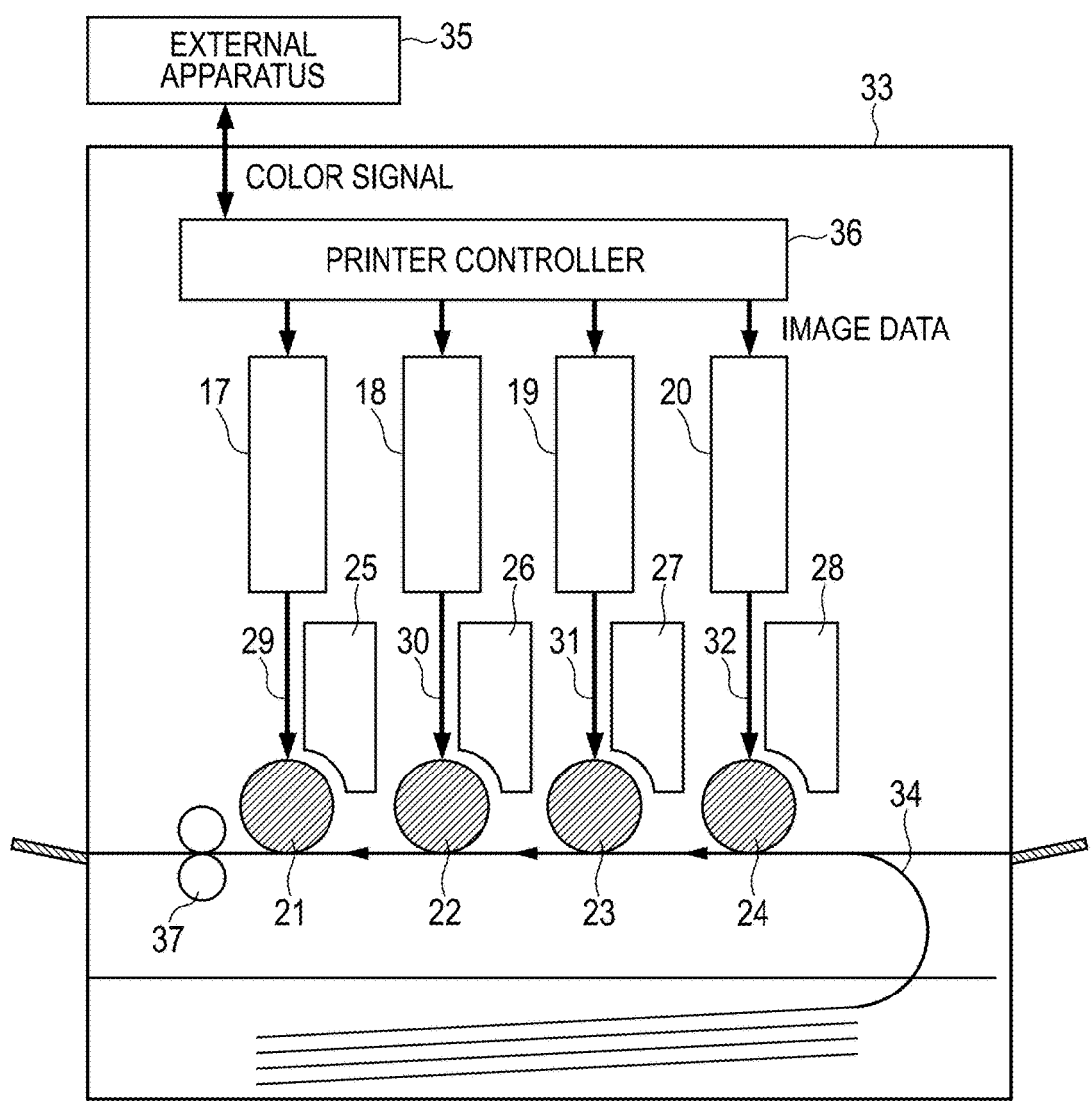
FIG. 11 is a sub-scanning cross-sectional view of a color image forming apparatus to which the lens array optical system according to the first embodiment is mounted.

FIG. 11 is a sub-scanning cross-sectional view for illustrating relevant parts of a color image forming apparatus 33 to which the lens array optical system according to the first embodiment is mounted.

The image forming apparatus 33 is a color image forming apparatus of a tandem type, which includes four exposure devices arranged parallel to each other and is configured to record image information on photosensitive drum surfaces being image bearing members.

The image forming apparatus 33 includes exposure devices 17, 18, 19, and 20, each including a light source and the lens array optical system according to the first embodiment, photosensitive drums 21, 22, 23, and 24 being image bearing members, and developing units 25, 26, 27, and 28. Further, the image forming apparatus 33 includes a conveyance belt 34, a printer controller 36, and a fixing unit 37.

The color image forming apparatus 33 inputs respective color signals of red (R), green (G), and blue (B) from an external apparatus 35 such as a personal computer. Those input color signals are converted into respective pieces of image data (dot data) of cyan (C), magenta (M), yellow (Y), and black (K) by the printer controller 36 included in the image forming apparatus 33. Those pieces of image data are input to the exposure apparatus 17, 18, 19, and 20, respectively. Then, the exposure apparatus 17, 18, 19, and 20 emit exposure beams 29, 30, 31, and 32 that are modulated based on respective pieces of image data, and those exposure beams expose photosensitive surfaces of the photosensitive drums 21, 22, 23, and 24.

Charging rollers (not shown) which are configured to uniformly charge surfaces of the photosensitive drums 21, 22, 23, and 24 are arranged so as to be brought into abutment against the surfaces of the photosensitive drums 21, 22, 23, and 24. Exposure light beams 29, 30, 31, and 32 are irradiated by the exposure devices 17, 18, 19, and 20 to the surfaces of the photosensitive drums 21, 22, 23, and 24 which are charged by the charging rollers.

As described above, the exposure light beams 29, 30, 31, and 32 are modulated based on image data for each color, and irradiation of the exposure light beams 29, 30, 31, and 32 causes electrostatic latent images to be formed on the surfaces of the photosensitive drums 21, 22, 23, and 24. The formed electrostatic latent images are developed as toner images by the developing units 25, 26, 27, and 28 which are arranged so as to be brought into abutment against the photosensitive drums 21, 22, 23, and 24.

The toner images developed by the developing units 25, 26, 27, and 28 are transferred by transfer rollers or transfer units (not shown), which are arranged so as to be opposed to the photosensitive drums 21, 22, 23, and 24, in superposition with one another onto a sheet which is a transferred member conveyed on the conveyance belt 34. With this, one full color image is formed on the sheet.

In the manner as described above, the sheet having unfixed toner images transferred thereon is further conveyed to the fixing unit 37 on downstream (left side in FIG. 11) of the photosensitive drums 21, 22, 23, and 24. The fixing unit 37 includes a fixing roller, which has a fixing heater (not shown) provided therein, and a pressure roller, which is arranged so as to be in press-contact with the fixing roller. The sheet conveyed from the transfer portion is pressed and heated at a press-contact portion between the fixing roller and the pressure roller. With this, the unfixed toner image on the sheet is fixed. Further, sheet discharge rollers (not shown) are arranged on downstream of the fixing roller. The sheet discharge rollers are configured to discharge the fixed sheet to outside of the image forming apparatus 33.

In the color image forming apparatus, four exposure devices 17, 18, 19, and 20 are arranged. The exposure devices 17, 18, 19, and 20 correspond to colors C, M, Y, and K, respectively, and simultaneously record image signals (image information) on photosensitive surfaces of the photosensitive drums 21, 22, 23, and 24. With this, a color image is printed at high speed. As the external apparatus 35, for example, a color image reading apparatus including a CCD sensor may be used. In this case, the color image reading apparatus and the color image forming apparatus 33 construct a color digital copying machine. The lens array optical system according to this embodiment is also applicable to a monochromatic image forming apparatus.

[Image Reading Apparatus]

FIG. 12 is a schematic cross-sectional view for illustrating an image reading apparatus 50 to which the lens array optical system according to the first embodiment is mounted.

The image reading apparatus 50 is configured to read, by a reading unit 41, an original 40 placed on an upper surface of an original table 43 formed of a transparent member. The original table 43 is supported by a frame 42, and the upper surface of the original table 43 matches with an original surface of the original 40.

Herein, the reading unit 41 includes an illumination unit configured to illuminate the original 40 through the original table 43, the lens array optical system according to the first embodiment, and a light receiving unit configured to receive light reflected from the original 40 and condensed by the lens array optical system.

The reading unit 41 is movable in a sub-scanning direction by a driving unit (not shown). Thus, the reading unit 41 can change a relative position between the original 40 and the lens array optical system along the sub-scanning direction. With this configuration, the reading unit 41 can successively read the original surface of the original 40 in the sub-scanning direction, thereby being capable of obtaining image data of an entire region of the original surface of the original 40.

At this time, the upper surface of the original table 43, that is, the original surface of the original 40 is arranged on the object plane of the lens array optical system, and a light-receiving surface (sensor surface) of the light-receiving unit is arranged on the image plane of the lens array optical system. As the light-receiving unit, there may be used a line sensor constructed by, for example, a CCD sensor or a CMOS sensor.

The image reading apparatus 50 may have a configuration in which a light beam emitted from the illumination unit and transmitted through the original 40 is received by the light-receiving unit. Further, as the illumination unit, there may be employed, not limited to the configuration including the light source, a configuration of guiding light from outside to the original 40.

According to the present invention, the imaging optical system capable of shielding the sub array direction ghost light fluxes can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-059714, filed Mar. 24, 2016, which is hereby incorporated by reference herein in its entirety.

What is claimed is:
1. An imaging optical system, comprising:
a first lens array including a plurality of lens rows each having a plurality of lenses arrayed in a first direction, the plurality of lens rows being arranged in a second direction which is perpendicular to the first direction and to an optical axis direction; and
a second lens array including a plurality of lens rows each having a plurality of lenses arrayed in the first direction, the plurality of lens rows being arranged in the second direction,
wherein the imaging optical system is configured to form an erect image of an object in a first cross section which is perpendicular to the second direction, and is configured to form an inverted image of the object in a second cross section which is perpendicular to the first direction, wherein at least one of the first lens array or the second lens array includes at least one of a scattering portion or a light-shielding portion arranged between adjacent lens rows, and wherein the following expression is satisfied:

$D/Rs \leq 0.2$ where D represents a length of at least one of the scattering portion or the light-shielding portion in the second direction, and Rs represents an effective diameter of the imaging optical system in the second direction.

2. An imaging optical system according to claim 1, wherein the first lens array is arranged closer to an object side than the second lens array, and at least one of the scattering portion or the light-shielding portion is arranged at least at one of a portion between image plane side lens surfaces of lenses constructing adjacent lens rows of the first lens array and a portion between object side lens surfaces of lenses constructing adjacent lens rows of the second lens array.

3. An imaging optical system according to claim 1, wherein the first lens array and the second lens array are arranged so that respective boundary planes between adjacent lens rows are flush with each other.

4. An imaging optical system according to claim 1, further comprising a light-shielding member which is arranged between the first lens array and the second lens array.

5. An imaging optical system according to claim 1, wherein the scattering portion is formed of at least one prism.

6. An imaging optical system according to claim 5, wherein the following expression is satisfied:

$30° \leq \varphi \leq 150°$ where $\varphi$ represents a top angle of the prism.

7. An imaging optical system according to claim 5, wherein the prism has a ridge line which is parallel to the first direction.

8. An imaging optical system according to claim 5, wherein the following expression is satisfied:

$h/d \leq 0.1$ where h represents a height of a top of the prism in the optical axis direction, and d represents a thickness of the plurality of lenses constructing the first lens array and/or the second lens array.

9. An imaging optical system according to claim 5, wherein the following expression is satisfied:

$h/\Delta \leq 0.1$ where h represents a height of a top of the prism in the optical axis direction, and $\Delta$ represents a distance between the first lens array and the second lens array in the optical axis direction.

10. An imaging optical system according to claim 5, wherein the prism has a shape which conforms to a lens surface of each lens constructing at least one of the first lens array or the second lens array.

11. An imaging optical system according to claim 1, wherein the scattering portion has embossed parts having an average depth of equal to or larger than 8 μm and equal to or smaller than 30 μm.

12. An imaging optical system according to claim 1, wherein the following expression is satisfied:

$D \leq 0.27\Delta$ where $\Delta$ represents a distance between the first lens array and the second lens array in the optical axis direction.

13. An imaging optical system according to claim 1, wherein the imaging optical system is configured to form an erect equal-magnification image of the object in the first cross section.

14. An imaging optical system according to claim 1, wherein the lens rows in each of the first lens array and the second lens array are arranged in a staggered manner in the second direction.

15. An imaging optical system according to claim 1, wherein the first lens array and the second lens array are shaped so as to be symmetrical over an intermediate imaging plane on which an intermediate image is to be formed.

16. An imaging optical system according to claim 1, wherein, in at least one of the first lens array or the second lens array, when an amount of separation in the first direction between optical axes of two lenses adjacent to each other in the second direction is 0, the lens surfaces of the two lenses are expressed by the following expression:

$$X = \sum_{i,j} C_{i,j} Y^i Z^j$$

where X, Y, and Z represent coordinates in the optical axis direction, the first direction, and the second direction, and $C_{i,j}$ represents an aspherical coefficient.

17. An imaging optical system according to claim 1, wherein an aperture of each lens surface of the plurality of lenses in the first lens array and the second lens array has a rectangular shape.

18. An imaging optical system according to claim 1, wherein each of the plurality of lenses has an anamorphic surface having a power in the first cross section and that in the second cross section different from each other.

19. An image forming apparatus, comprising:
an imaging optical system;
a developing unit configured to develop an electrostatic latent image, which is formed on a photosensitive surface by the imaging optical system, into a toner image;
a transfer unit configured to transfer the developed toner image onto a transfer material; and
a fixing unit configured to fix the transferred toner image on the transfer material,
wherein the imaging optical system comprises:
a first lens array including a plurality of lens rows each having a plurality of lenses arrayed in a first direction, the plurality of lens rows being arranged in a second direction which is perpendicular to the first direction and to an optical axis direction; and
a second lens array including a plurality of lens rows each having a plurality of lenses arrayed in the first direction, the plurality of lens rows being arranged in the second direction,
wherein the imaging optical system is configured to form an erect image of an object in a first cross section which is perpendicular to the second direction, and is configured to form an inverted image of the object in a second cross section which is perpendicular to the first direction,
wherein at least one of the first lens array or the second lens array includes at least one of a scattering portion or a light-shielding portion arranged between adjacent lens rows, and
wherein the following expression is satisfied:

$D/Rs \leq 0.2$ where D represents a length of at least one of the scattering portion or the light-shielding portion in the second direction, and Rs represents an effective diameter of the imaging optical system in the second direction.

20. An image reading apparatus, comprising:
   an imaging optical system;
   an illumination unit configured to illuminate an original; and
   a light-receiving unit configured to receive a light flux which comes from the original and is condensed by the imaging optical system,
   wherein the imaging optical system comprises:
      a first lens array including a plurality of lens rows each having a plurality of lenses arrayed in a first direction, the plurality of lens rows being arranged in a second direction which is perpendicular to the first direction and to an optical axis direction; and
      a second lens array including a plurality of lens rows each having a plurality of lenses arrayed in the first direction, the plurality of lens rows being arranged in the second direction,
   wherein the imaging optical system is configured to form an erect image of an object in a first cross section which is perpendicular to the second direction, and is configured to form an inverted image of the object in a second cross section which is perpendicular to the first direction,
   wherein at least one of the first lens array or the second lens array includes at least one of a scattering portion or a light-shielding portion arranged between adjacent lens rows, and
   wherein the following expression is satisfied:

$$D/Rs \leq 0.2$$

where D represents a length of at least one of the scattering portion or the light-shielding portion in the second direction, and Rs represents an effective diameter of the imaging optical system in the second direction.

* * * * *